(12) United States Patent
Malur Srinivasan et al.

(10) Patent No.: US 11,749,009 B2
(45) Date of Patent: Sep. 5, 2023

(54) AUTOMATED EMPATHETIC ASSESSMENT OF CANDIDATE FOR JOB

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 359 days.

(21) Appl. No.: 17/249,868

(22) Filed: Mar. 17, 2021

(65) Prior Publication Data

US 2022/0300736 A1 Sep. 22, 2022

(51) Int. Cl.
*G06V 30/416* (2022.01)
*G06N 3/08* (2023.01)
*G06F 18/22* (2023.01)
*G06F 18/21* (2023.01)
*G06Q 10/0631* (2023.01)
*G06Q 50/00* (2012.01)
*G06Q 10/1053* (2023.01)

(52) U.S. Cl.
CPC ........ *G06V 30/416* (2022.01); *G06F 18/2178* (2023.01); *G06F 18/22* (2023.01); *G06N 3/08* (2013.01); *G06Q 10/063112* (2013.01); *G06Q 10/1053* (2013.01); *G06Q 50/01* (2013.01)

(58) Field of Classification Search
CPC ....... G06Q 10/063112; G06Q 10/1053; G06Q 50/01; G06F 18/22; G06F 18/2178; G06N 3/08; G06V 10/82; G06V 30/416
See application file for complete search history.

(56) References Cited

U.S. PATENT DOCUMENTS

| | | | | |
|---|---|---|---|---|
| 10,963,841 | B2* | 3/2021 | Olshansky | G10L 25/63 |
| 2019/0197486 | A1* | 6/2019 | Jersin | G06F 16/735 |
| 2020/0065769 | A1* | 2/2020 | Gupta | G06Q 10/1053 |
| 2021/0158636 | A1* | 5/2021 | Olshansky | G06Q 10/1053 |

OTHER PUBLICATIONS

Extended European Search Report [EESR] mailed by the European Patent Office dated May 6, 2022, in connection with European Patent Application EP 22 15 111, a foreign counterpart application of the above-referenced matter, 12 pages.

(Continued)

*Primary Examiner* — Daniel G Mariam
(74) *Attorney, Agent, or Firm* — Fujitsu Patent Center

(57) ABSTRACT

In an embodiment, operations include extracting first information about a first set of features of a first candidate, from a document or profile information of the first candidate. Second information about a second set of features, corresponding to the first set of features, is extracted from one or more databases. The second set of features is associated with a population of candidates with at least one demographic parameter same as that of the first candidate. A third set of features is determined based on difference of corresponding features from the first set of features and the second set of features. A pre-trained neural network model is applied on the third set of features to determine a set of weights associated with the third set of features. An empathy score of the first candidate is determined based on the set of weights. The empathy score of the first candidate is rendered.

20 Claims, 9 Drawing Sheets

(56) References Cited

OTHER PUBLICATIONS

Manish Raghavan, et al., "Mitigating Bias in Algorithmic Hiring: Evaluating Claims and Practices", arXiv:1906.09208v3, Dec. 6, 2019, pp. 1-24.
Ariel D. Procaccia, et al., "Optimal Aggregation of Uncertain Preferences", obtained from http://procaccia.info/wp-content/uploads/2020/03/uncertainty.pdf, on Mar. 12, 2021, 9 pages.
Andi Peng, et al., "What You See is What You Get? The Impact of Representation Criteria on Human Bias in Hiring", Association for the Advancement of Artificial Intelligence (www.aaai.org), arXiv:1909.03567 v1, Sep. 8, 2019, 11 pages.
Javier Sanchez-Monedero, et al., "What Does it Mean to 'Solve' the Problem of Discrimination in Hiring? Social, Technical and Legal Perspectives from the UK on Automated Hiring Systems", FAT* '20, Jan. 27-30, 2020, Barcelona, Spain, https://doi.org/10.1145/3351095.3372849, arXiv:1910.06144v2, Jan. 17, 2020, 11 pages.
Mian Costa, et al., "Hiring Fairly in the Age of Algorithims", obtained from https://arxiv.org/ftp/arxiv/papers/2004/2004.07132.pdf on Mar. 12, 2021, 33 pages.
Jeanette Maister, "Resume Bias is Real: Closing Gaps and Advancing the Screening Process", Recruiting Daily, https://recruitingdaily.com/resume-bias-is-real-closing-gaps-and-advancing-the-screening-process/, Jan. 30, 2019, 5 pages.
Kimberly A. Houser, "Can AI Solve the Diversity Problem in the Tech Industry? Mitigating Noise and Bias in Employment Decision-Making", 22 Stan. Tech. L. Rev. 290 (2019), https://www-cdn.law.stanford.edu/wp-content/uploads/2019/08/Houser_20190830_test.pdf, 66 pages.
Lydia Dishman, "This is the Main Way Men's and Women's Resumes are Different", Fast Company, https://www.fastcompany.com/40590450/this-is-the-main-way-mens-and-womens-resumes-are-different, Jun. 27, 2018, 7 pages.
Centre for Data Ethics and Innovation (CDEI), "Interim Report: Review Into Bias in Algorithmic Decision-Making—GOV-UK", https://www.gov.uk/government/publications/interim-reports-from-the-centre-for-data-ethics-and-innovation/interim-report-review-into-bias-in-algorithmic-decision-making, Mar. 11, 2021, 17 pages.
Tolga Bolukbasi, et al., "Man is to Computer Programmer as Woman is to Homemaker? Debiasing Word Embeddings", arXiv:1607.06520v1 [cs.CL]. Jul. 21, 2016, pp. 1-25.
"Amazon Ditched AI Recruiting Tool that Favored Men for Technical Jobs", published by Reuters in The Guardian, Oct. 10, 2018, https://www.theguardian.com/technology/2018/oct/10/amazon-hiring-ai-gender-bias-recruiting-engine, pp. 1-5.
McKenzie Raub, "Bots, Bias and Big Data: Artificial Intelligence, Algorithmic Bias and Disparate Impact Liability in Hiring Practices", Arkansas Law Review, vol. 71, No. 2, Article 7, Dec. 2018, 43 pages.

* cited by examiner

AUTOMATED EMPATHETIC ASSESSMENT OF CANDIDATE FOR JOB

FIELD

The embodiments discussed in the present disclosure are related to automated empathetic assessment of a candidate for a job.

BACKGROUND

Advancements in the field of machine learning and artificial intelligence (AI) have led to development of numerous machine learning and AI based recruiting tools. Examples of such tools may include human resource chatbots for interview scheduling, tools for writing job descriptions, conversational chatbots for candidate screening, tools for resume/candidate screening, and tools for profiling potential candidates based on current employees. However, certain machine learning and AI based recruiting tools may be biased in the screening of resumes/candidates. For example, certain tools may be biased based on the gender (or age, race, or caste) of the candidate. Use of such tools may also reduce work-place diversity, as such tools may often lead to selection of candidates with similar demographics. Thus, there is a need for a solution for assessment of a candidate for a job with minimal biases.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include extracting first information about a first set of features, associated with a first candidate, from at least one of: a document or profile information associated with the first candidate. The operations may further include extracting second information about a second set of features, corresponding to the first set of features, from one or more databases. The second set of features may be associated with a population of candidates with at least one of a set of demographic parameters same as a demographic parameter of the first candidate. The operations may further include determining a third set of features based on a difference of corresponding features from the first set of features associated with the first candidate and the second set of features associated with the population of candidates. The operations may further include applying a pre-trained neural network model on the determined third set of features. The neural network model may be pre-trained to determine an empathy score for each of a set of candidates, based on the first set of features associated with the set of candidates. The operations may further include determining a set of weights associated with the third set of features, based on the application of the pre-trained neural network model. The operations may further include determining the empathy score associated with the first candidate based on the determined set of weights. The operations may further include rendering the determined empathy score associated with the first candidate.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
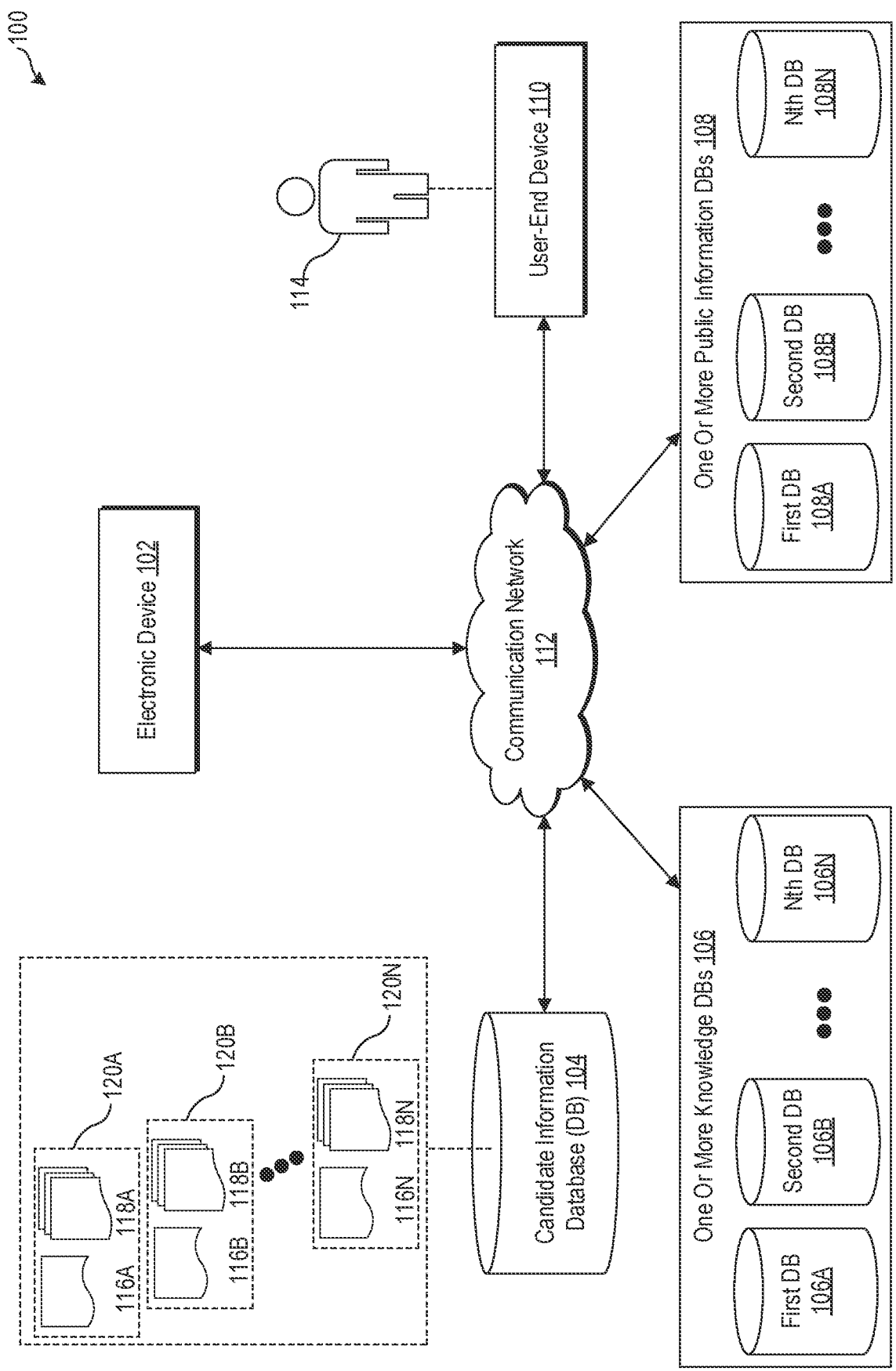
FIG. 1 is a diagram representing an example environment related to empathetic assessment of job applications.

Some embodiments described in the present disclosure relate to methods and systems for an automated empathetic assessment of a candidate for a job. In the present disclosure, first information about a first set of features associated with a first candidate may be extracted. The first information may be extracted from at least one of a document (such as a resume) or profile information associated with the first candidate. Further, second information about a second set of features that may correspond to the first set of features may be extracted from one or more databases (e.g., one or more knowledge databases). The second set of features may be associated with a population of candidates with at least one of a set of demographic parameters same as a demographic parameter of the first candidate. Thereafter, a third set of features may be determined based on a difference of corresponding features from the first set of features associated with the first candidate and the second set of features associated with the population of candidates. Further, a pre-trained neural network model may be applied on the determined third set of features. The neural network model may be pre-trained to determine an empathy score for each of a set of candidates, based on the first set of features associated with the set of candidates. Further, a set of weights associated with the third set of features may be determined, based on the application of the pre-trained neural network model. The empathy score associated with the first candidate may be determined based on the determined set of weights. Further, the determined empathy score associated with the first candidate may be rendered.

According to one or more embodiments of the present disclosure, the technological field of automated assessment of a candidate for a job may be improved by configuring a computing system in a manner that the computing system may be able to empathically score the candidate for the job with minimal biases. The computing system may determine a difference between a first set of features (for example, but is not limited to, an educational qualification, certifications, languages known, or a skill set) of the candidate and corresponding features in a second set of features of a population of candidates belonging to a similar demographic background as the candidate. The computing system may determine an empathy score associated with the candidate based on the difference between the first set of features associated with the candidate and the second set of features associated with the population of candidates. The difference may be indicative of a skill acquiring ability and also hard work on the part of the candidate as compared to other candidates with a similar demographic background. A higher difference may entail a higher empathy score associated with the candidate and a likely selection of the candidate for a job. The computing system may thereby factor-in the empathy for the automated assessment of the candidate for the job based on a difference of qualifications or skillsets of the candidate and that of the population of candidates of similar demographic background as the candidate, as compared to other conventional systems which may not consider such empathy in the assessment of the candidate for the job. The disclosed system may be advantageous as the candidate's inherent skill acquiring ability and hard-working ability, which may be useful for most job positions, may be factored-in during the automated assessment of the candidate, based on the empathy score determined for the candidate. Also, based on the empathy score of the candidate, the candidate may be provided equal job opportunity with respect to other candidates with similar qualification/skillset but different with demographic background. Thus, the use of the computing system may also help in increasing diversity of the work-force in an organization.

The system may be configured to extract first information about a first set of features, associated with a first candidate, from at least one of: a document or profile information associated with the first candidate. The document associated with the first candidate may be, for example, a resume or a curriculum vitae of the first candidate. The profile information associated with the first candidate may include information associated with at least one of, but not limited to, a job cover-letter, a set of recommendations, a source code repository, a project page, a professional networking webpage, or a social networking webpage associated with the first candidate. The first set of features may include at least one of, but not limited to, a set of education degrees, a set of certifications, a number of years of work experience, a location, a set of languages studied or known, a physical disability, a set of skills, an age, a gender, or a per capita income, associated with the first candidate. The extraction of the first information is described further, for example, in FIGS. 3, 4, and 5.

The system may be configured to extract second information about a second set of features, corresponding to the first set of features, from one or more databases (e.g., one or more knowledge databases). The second set of features may be associated with a population of candidates with at least one of a set of demographic parameters same as a demographic parameter of the first candidate. Examples of the set of demographic parameters may include, but are not limited to, a location, a family income, type of institution studied in, educational qualifications, certifications, skillset, family background, resources available, and languages known or studied. The second set of features may include at least one of, but not limited to, an average per capita income, a set of education degrees, a set of certifications, a number of institutions, a number of job applicants, a number of graduates, a number of jobs secured, a set of languages studied or known, associated with the population of candidates. The extraction of the second information is described further, for example, in FIGS. 3, 4, and 6.

The system may be configured to determine a third set of features based on a difference of corresponding features from the first set of features associated with the first candidate and the second set of features associated with the population of candidates. Further, the system may be configured to apply a pre-trained neural network model on the determined third set of features. The neural network model may be pre-trained to determine an empathy score for each of a set of candidates, based on the first set of features associated with the set of candidates. The system may be configured to determine a set of weights associated with the third set of features, based on the application of the pre-trained neural network model. Further, the system may be configured to determine the empathy score associated with the first candidate based on the determined set of weights. The system may be configured to render the determined empathy score associated with the first candidate. The automatic empathy-based assessment of the candidate for a job is described further, for example, in FIGS. 3 and 4.

The system may be configured to apply a regularization constraint on the pre-trained neural network model based on a criteria associated with one or more protected features from the first set of features associated with the first candidate. The determination of the empathy score associated with the first candidate may be further based on the application of the regularization constraint on the pre-trained neural network model. The criteria may correspond to a counterfactual criteria (e.g., a counterfactual fairness criteria) such that a first likelihood of acceptance of the first candidate with a first value of a first protected feature of the one or more protected features may be same as a second likelihood of acceptance of a second candidate with a second value of the first protected feature, based on a determination that values of others of the first set of features are same. Examples the one or more protected (or sensitive) features may include at least one of, but not limited to, an age, a gender, or a physical disability, associated with the first candidate. The application of the regularization constraint is described further, for example, in FIGS. 3 and 7.

The system may be further configured to extract a first set of named-entities from at least one of: the document or the profile information associated with the first candidate and further filter the extracted first set of named-entities to extract a second set of named-entities. Further, the system may be configured to extract the first set of features associated with the first candidate based on removal of the extracted second set of named-entities from the extracted first set of named-entities. The system may be configured to verify an authenticity of the first information associated with at least one of, but not limited to, the document, the profile information, or the first set of named-entities associated with the first candidate, based on one or more public information databases. The determination of the empathy score associated with the first candidate may be further based on the verification of the authenticity. The extraction of the first set of features and the verification of the authenticity of the first information are described further, for example, in FIGS. 3 and 5.

The system may be configured to transmit one or more queries to the one or more databases (e.g., the one or more knowledge databases). The one or more queries may be formed based on one or more combinations of the first set of features associated with the first candidate. Further, the system may be configured to extract the second information about the second set of features, corresponding to the first set of features, based on the transmitted one or more queries. The extraction of the second information based on the transmission of the one or more queries is described further, for example, in FIGS. 3 and 6.

The system may be configured to receive a set of empathy scores for a set of documents in a training dataset of the neural network model, based on user input from one or more human evaluators. Further, the system may be configured to compute a pair-wise ranking between the received set of empathy scores for each of the set of documents. The system may be configured to determine an optimum empathy score ranking for each of the set of documents based on a minimization of a Kendall Tau distance across the computed pair-wise rankings. Further, the system may be configured to train the neural network model based on the determined optimum empathy score ranking for each of the set of documents in the training dataset. The training of the neural network model is described further, for example, in FIG. 8.

Typically, conventional systems may not incorporate empathy in the assessment of a candidate for a job. Conventional systems may only use information associated with job description, a candidate's educational qualifications and skillset for the assessment of the job application of the candidate without consideration of background factors of the candidate, such as, the candidate's family background, family income, and current/past resources available to the candidate. Further, the conventional systems may have biases with respect to certain factors such as, but not limited to, educational institutions of the candidate, gender of the candidate, and/or age of the candidate. In addition, the conventional systems may select candidates with similar backgrounds for a job. Utilization of such conventional systems for recruiting, may reduce a diversity in a workforce of an organization. The disclosed system, on the other hand, may determine a difference between the first set of features (for example, educational qualification, certifications, languages known, and skill set) of a candidate and corresponding features in the second set of features of a population of candidates belonging to a similar demographic background as the candidate. An empathy score associated with the candidate may then be determined based on the difference between the first set of features associated with the candidate and the second set of features associated with the population of candidates. The difference may be indicative of a skill acquiring ability and also hard work done on the part of the candidate as compared to other candidates with the similar demographic background. A higher difference may entail a higher empathy score associated with the candidate and a likely selection of the candidate for a job. The disclosed system may thereby factor-in empathy for the automated assessment of the candidate based on a difference of qualifications or other skillsets of the candidate and that of the population of candidates of similar demographic background as the candidate, as compared to other conventional systems which may not consider such empathy in the assessment of the candidate for the job. The disclosed system may be advantageous as the candidate's inherent skill acquiring ability and hard-working ability, which may be useful for most job positions, may be factored-in during the automated assessment of the candidate, based on the empathy score determined for the candidate. Also, based on the empathy score of the candidate, the candidate may be provided equal job opportunity with respect to other candidates with similar qualification/skillset but different demographic background. Thus, the use of the disclosed system may also help in increasing diversity of the work-force in an organization. Further, based on the incorporation of the counterfactual fairness criteria as the regularization constraint, the disclosed system may be less biased with respect to various protected or sensitive features (such as, age, physical disability, and gender), as compared to the conventional systems.

Embodiments of the present disclosure are explained with reference to the accompanying drawings.

FIG. 1 is a diagram representing an example environment related to empathetic assessment of job applications, arranged in accordance with at least one embodiment described in the present disclosure. With reference to FIG. 1, there is shown an environment 100. The environment 100 may include an electronic device 102, a candidate information database (DB) 104, one or more knowledge DBs 106, one or more public information DBs 108, a user-end device 110, and a communication network 112. The electronic device 102, the candidate information DB 104, the one or more knowledge DBs 106, the one or more public information DBs 108, and the user-end device 110 may be communicatively coupled to each other, via the communication network 112. The one or more knowledge DBs 106 may include a first DB 106A, a second DB 106B, . . . and an Nth DB 106N. Further, the one or more public information DBs 108 may include a first DB 108A, a second DB 108B, . . . and an Nth DB 108N. In FIG. 1, there is further shown a user 114 who may be associated with or operating the electronic device 102 or the user-end device 110. There is further shown first candidate information 120A associated with a first candidate, second candidate information 120B associated with a second candidate, . . . and Nth candidate information 120N associated with an Nth candidate. The first candidate information 120A may include a first document 116A and first profile information 118A. The second candidate information 120B may include a second document 116B and second profile information 118B. Similarly, the Nth candidate information 120N may include an Nth document 116N and Nth profile information 118N. The first candidate information 120A, the second candidate information 120B, . . . and the Nth candidate information 120N may be stored in the candidate information DB 104.

The electronic device 102 may include suitable logic, circuitry, interfaces, and/or code that may be configured to empathetically assess a job application of a candidate based on determination of an empathy score associated with the candidate. The electronic device 102 may retrieve candidate information of the candidate from the candidate information DB 104 for determination of the empathy score associated with the candidate. For example, the electronic device 102 may retrieve the first candidate information 120A associated with the first candidate from the candidate information DB 104. The first candidate information 120A may include the first document 116A and the first profile information 118A. The first document 116A may include, for example, a resume document or a curriculum vitae document, associated with the first candidate. The first profile information 118A associated with the first candidate may include information at least one of, but not limited to, a job cover-letter, a set of recommendations, a source code repository, a project page, a professional networking webpage, or a social networking webpage associated with the first candidate. The electronic device 102 may be configured to extract first information about a first set of features, associated with the first candidate from at least one of, but not limited to, a document (e.g., the first document 116A) or profile information (e.g., the first profile information 118A) associated with the first candidate. The first set of features may include at least one of, but not limited to, a set of education degrees, a set of certifications, a number of years of work experience, a location, a set of languages studied or known, a physical disability, a set of skills, an age, a gender, or a per capita income, associated with the first candidate. The extraction of the first information is described further, for example, in FIGS. 3, 4, and 5.

The electronic device 102 may be configured to extract second information about a second set of features (i.e. corresponding to the first set of features), from one or more databases (e.g., the one or more knowledge DBs 106). The second set of features may be associated with a population of candidates with at least one of a set of demographic parameters same as a demographic parameter of the first candidate. Examples of the set of demographic parameters may include, but is not limited to, a family income, a location, type of institution studied in, educational qualifications, certifications, skillset, family background, resources available, and/or languages known or studied. The second set of features may include at least one of, but not limited to, an average per capita income, a set of education degrees, a set of certifications, a number of job applicants, a number of graduates, a number of institutions, a number of jobs secured, a set of languages studied or known, associated with the population of candidates. The extraction of the second information is described further, for example, in FIGS. 3, 4, and 6.

The electronic device 102 may be configured to determine a third set of features based on a difference of corresponding features from the first set of features associated with the first candidate and the second set of features associated with the population of candidates. Further, the electronic device 102 may be configured to apply a pre-trained neural network model on the determined third set of features. The neural network model may be pre-trained to determine an empathy score for each of a set of candidates, based on the first set of features associated with the set of candidates. The electronic device 102 may be configured to determine a set of weights associated with the third set of features, based on the application of the pre-trained neural network model. Further, the electronic device 102 may be configured to determine the empathy score associated with the first candidate based on the determined set of weights. The electronic device 102 may be configured to render the determined empathy score associated with the first candidate. The empathy-based assessment of the candidate for a job is described further, for example, in FIGS. 3 and 4.

Examples of the electronic device 102 may include, but are not limited to, a recruitment engine or machine, a mobile device, a desktop computer, a laptop, a computer workstation, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The candidate information DB 104 may include suitable logic, interfaces, and/or code that may be configured to store candidate information including a document and profile information, associated with one or more candidates. The candidate information DB 104 may be a relational or a non-relational database. Also, in some cases, the candidate information DB 104 may be stored on a server, such as a cloud server or may be cached and stored on the electronic device 102. The server of the candidate information DB 104 may be configured to receive a request for at least one of the document (e.g., the first document 116A) and profile information (e.g., the first profile information 118A) associated with a candidate (e.g., the first candidate) from the electronic device 102, via the communication network 112. In response, the server of the candidate information DB 104 may be configured to retrieve and provide the requested document and the profile information to the electronic device 102 based on the received request, via the communication network 112. In some embodiments, the candidate information DB 104 may include a plurality of servers stored at different locations. Additionally, or alternatively, the candidate information DB 104 may be implemented using hardware including a processor, a microprocessor (e.g., to perform or control performance of one or more operations), a field-programmable gate array (FPGA), or an application-specific integrated circuit (ASIC). In some other instances, the candidate information DB 104 may be implemented using a combination of hardware and software.

The one or more knowledge databases (DBs) 106 may include suitable logic, interfaces, and/or code that may be configured to store demographic information and candidate information, associated with a population of candidates in a region. The one or more knowledge DBs 106 may be a relational or a non-relational database. Also, in some cases, the one or more knowledge DBs 106 may be stored on a server, such as a cloud server or may be cached and stored on the electronic device 102. The server of the one or more knowledge DBs 106 may be configured to receive one or more queries based on one or more combinations of the first set of features associated with the first candidate, from the electronic device 102, via the communication network 112. In response, the server of the one or more knowledge DBs 106 may be configured to extract and provide the second information about the second set of features corresponding to the first set of features, to the electronic device 102 based on the received request, via the communication network 112. In some embodiments, the one or more knowledge DBs 106 may include a plurality of servers stored at different locations. Additionally, or alternatively, the one or more knowledge DBs 106 may be implemented using hardware including a processor, a microprocessor (e.g., to perform or control performance of one or more operations), a field-programmable gate array (FPGA), or an application-specific integrated circuit (ASIC). In some other instances, the one or more knowledge DBs 106 may be implemented using a combination of hardware and software.

The one or more public information databases (DBs) 108 may include suitable logic, interfaces, and/or code that may be configured to store public records (such as, but not limited to, school records, university or college records, certification records, training record, achievement records, and/or work experience records) associated with one or more candidates. The one or more public information DBs 108 may be a relational or a non-relational database. Also, in some cases, the one or more public information DBs 108 may be stored on a server, such as a cloud server or may be cached and stored on the electronic device 102. The server of the one or more public information DBs 108 may be configured to receive a request for verification of an authenticity of the first information associated with at least one of the document (e.g., the first document 116A), the profile information (e.g., the first profile information 118A), or a first set of named entities, associated with the first candidate. The request may be received from the electronic device 102, via the communication network 112. In response, the server of the one or more public information DBs 108 may be configured to verify the authenticity of the first information to the electronic device 102 based on the received request, via the communication network 112. In some embodiments, the one or more public information DBs 108 may include a plurality of servers stored at different locations. Additionally, or alternatively, the one or more public information DBs 108 may be implemented using hardware including a processor, a microprocessor (e.g., to perform or control performance of one or more operations), a field-programmable gate array (FPGA), or an application-specific integrated circuit (ASIC). In some other instances, the one or more public information DBs 108 may be implemented using a combination of hardware and software.

The user-end device 110 may include suitable logic, circuitry, interfaces, and/or code that may be configured to generate or receive candidate information (such as, the first candidate information 120A, for e.g., the first document 116A and first profile information 118A) of a candidate (e.g., the first candidate). For example, the user-end device 110 may include a web-browser software or an electronic mail software, through which the user-end device 110 may receive the candidate information of the candidate. Additionally, or alternatively, the user-end device 110 may include a word or text processing software through which the candidate information (e.g., a resume document and/or profile information) of the candidate may be generated based on user input from the user 114 or from the candidate himself/herself. The user-end device 110 may upload the generated or received candidate information associated with the candidate to the electronic device 102 for extraction of the first information associated with the candidate (e.g., the first candidate). In addition, the user-end device 110 may upload the generated or received candidate information to the candidate information DB 104 for storage. The user-end device 110 may be further configured to receive the empathy score associated with the candidate (e.g., the first candidate) from the electronic device 102. The user-end device 110 may render the received empathy score associated with the candidate on a display screen of the user-end device 110 for the user 114. In some embodiments, the user-end device 110 may receive a request to determine the empathy score for the candidate (such as the first candidate) from the user 114 (for example a recruiter or any employee of an organization). The user-end device 110 may further send such request to the electronic device 102 for the determination of the empathy score for the candidate. Examples of the user-end device 110 may include, but are not limited to, a mobile device, a desktop computer, a laptop, a computer workstation, a computing device, a mainframe machine, a server, such as a cloud server, and a group of servers. Although in FIG. 1, the user-end device 110 is separated from the electronic device 102; however, in some embodiments, the user-end device 110 may be integrated in the electronic device 102, without a deviation from the scope of the disclosure.

The communication network 112 may include a communication medium through which the electronic device 102 may communicate with the servers which may store various databases (such as, the candidate information DB 104, the one or more knowledge DBs 106, and the one or more public information DBs 108), and the user-end device 110. Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the various databases (such as, the candidate information DB 104, the one or more knowledge DBs 106, and the one or more public information DBs 108) and the user-end device 110. In addition, in some embodiments, the functionality of each of the various databases (such as, the candidate information DB 104, the one or more knowledge DBs 106, and the one or more public information DBs 108) and the user-end device 110 may be incorporated into the electronic device 102, without a deviation from the scope of the disclosure.

Figure 2:
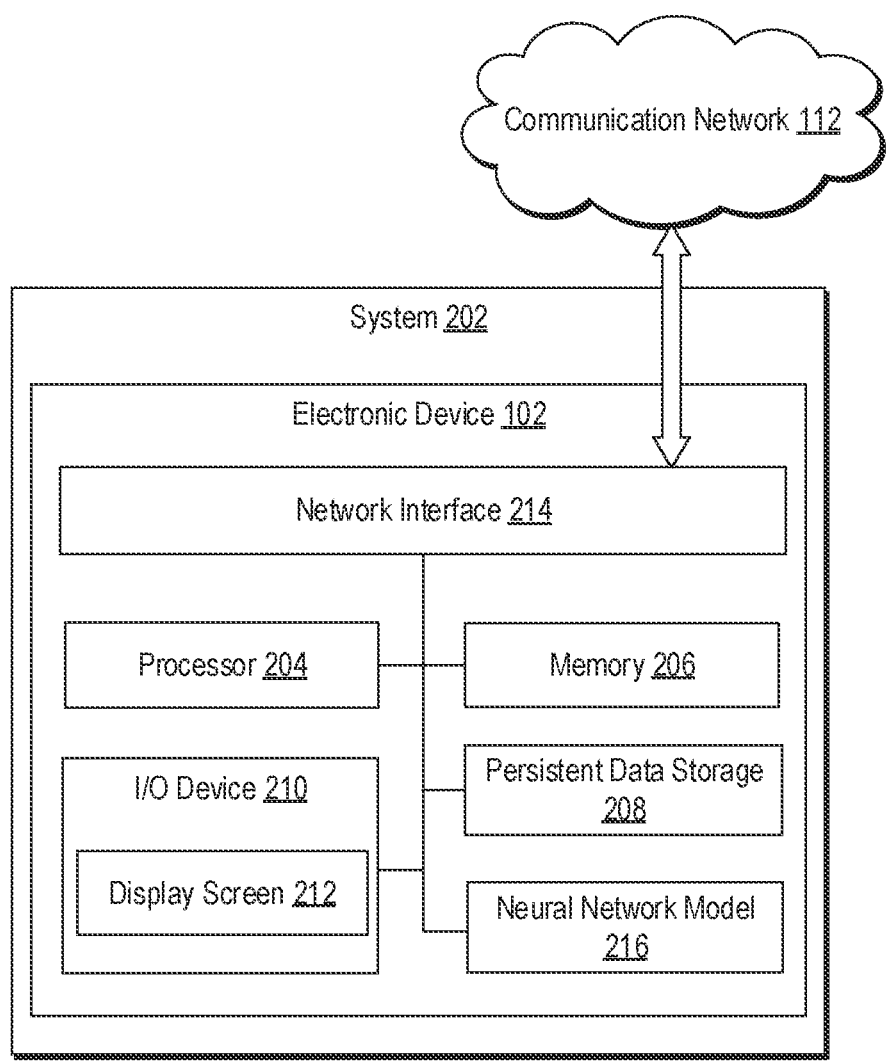
FIG. 2 is a block diagram that illustrates an exemplary electronic device for empathic assessment of a candidate for a job.

FIG. 2 is a block diagram that illustrates an exemplary electronic device for empathic assessment of a candidate for a job, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, a network interface 214, and a neural network model 216.

The processor 204 may include suitable logic, circuitry, and/or interfaces that may be configured to execute program instructions associated with different operations to be executed by the electronic device 102. For example, some of the operations may include extracting the first information, extracting the second information, determining the third set of features, applying the pre-trained neural network model (e.g., the neural network model 216) on the determined third set of features. The operations may further include determining the set of weights associated with the third set of features, determining the empathy score associated with the first candidate, and rendering the determined empathy score. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store candidate information (e.g., the first candidate information 120A including the first document 116A and the first profile information 118A) of a candidate (e.g., the first candidate) retrieved from the candidate information DB 104. Either of the memory 206, the persistent data storage 208, or combination may further store information associated with the extracted first information, the extracted second information, the determined third set of features, the determined set of weights, and the determined empathy score associated with the candidate (e.g., the first candidate).

The neural network model 216 may be a computational network or a system of artificial neurons, arranged in a plurality of layers, as nodes. The plurality of layers of the neural network model 216 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 216. Outputs of each hidden layer may be coupled to inputs of at least one node in other layers of the neural network model 216. Node(s) in the final layer may receive inputs from at least one hidden layer to output a result. The number of layers and the number of nodes in each layer may be determined from hyper-parameters of the neural network model 216. Such hyper-parameters may be set before or while training the neural network model 216 on a training dataset.

Each node of the neural network model 216 may correspond to a mathematical function (e.g., a sigmoid function or a rectified linear unit) with a set of parameters, tunable during training of the neural network model 216. The set of parameters may include, for example, a weight parameter, a regularization parameter, and the like. Each node may use the mathematical function to compute an output based on one or more inputs from nodes in other layer(s) (e.g., previous layer(s)) of the neural network model 216. All or some of the nodes of the neural network model 216 may correspond to same or a different mathematical function.

In training of the neural network model 216, one or more parameters of each node of the neural network model 216 may be updated based on whether an output of the final layer for a given input (from the training dataset) matches a correct result based on a loss function for the neural network model 216. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The neural network model 216 may include electronic data, such as, for example, a software program, code of the software program, libraries, applications, scripts, or other logic or instructions for execution by a processing device, such as the processor 204. The neural network model 216 may include code and routines configured to enable a computing device including the processor 204 to perform one or more tasks such as, determination of an empathy score for a candidate based on a set of features associated with the candidate, and/or determination of a set of weights associated with the set of features associated with the candidate. Additionally, or alternatively, the neural network model 216 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 216 may be implemented using a combination of hardware and software.

Examples of the neural network model 216 may include, but are not limited to, a deep neural network (DNN), a convolutional neural network (CNN), an artificial neural network (ANN), a recurrent neural network (RNN), CNN-recurrent neural network (CNN-RNN), a Long Short-Term Memory (LSTM) network based RNN, LSTM+ANN, Connectionist Temporal Classification (CTC) based RNN, a fully connected neural network, a deep Bayesian neural network, and/or a combination of such networks. In some embodiments, the neural network model 216 may include numerical computation techniques using data flow graphs. In certain embodiments, the neural network model 216 may be based on a hybrid architecture of multiple Deep Neural Networks (DNNs).

The I/O device 210 may include suitable logic, circuitry, interfaces, and/or code that may be configured to receive a user input. For example, the I/O device 210 may receive a user input to retrieve candidate information (e.g., the first candidate information 120A including the first document 116A and the first profile information 118A) associated with a candidate (e.g., the first candidate). In another example, the I/O device 210 may receive a user input to create a new document or profile information, or to edit an existing document (such as, the retrieved first document 116A) or existing profile information (e.g., the retrieved first profile information 118A), and/or store the created/edited document or profile information. The I/O device 210 may further receive a user input that may include an instruction to determine the empathy score associated with the candidate (e.g., the first candidate). The I/O device 210 may be further configured to provide an output in response to the user input. For example, the I/O device 210 may render the empathy score associated the first candidate (as may be determined by the electronic device 102) on the display screen 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display screen 212 may comprise suitable logic, circuitry, interfaces, and/or code that may be configured to display the empathy score associated with a candidate (e.g., the first candidate). The display screen 212 may be configured to receive the user input from the user 114. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the various databases (the candidate information DB 104, the one or more knowledge DBs 106, and the one or more public information DBs 108), and the user-end device 110, via the communication network 112. The network interface 214 may be implemented by use of various known technologies to support wired or wireless communication of the electronic device 102 via the communication network 112. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
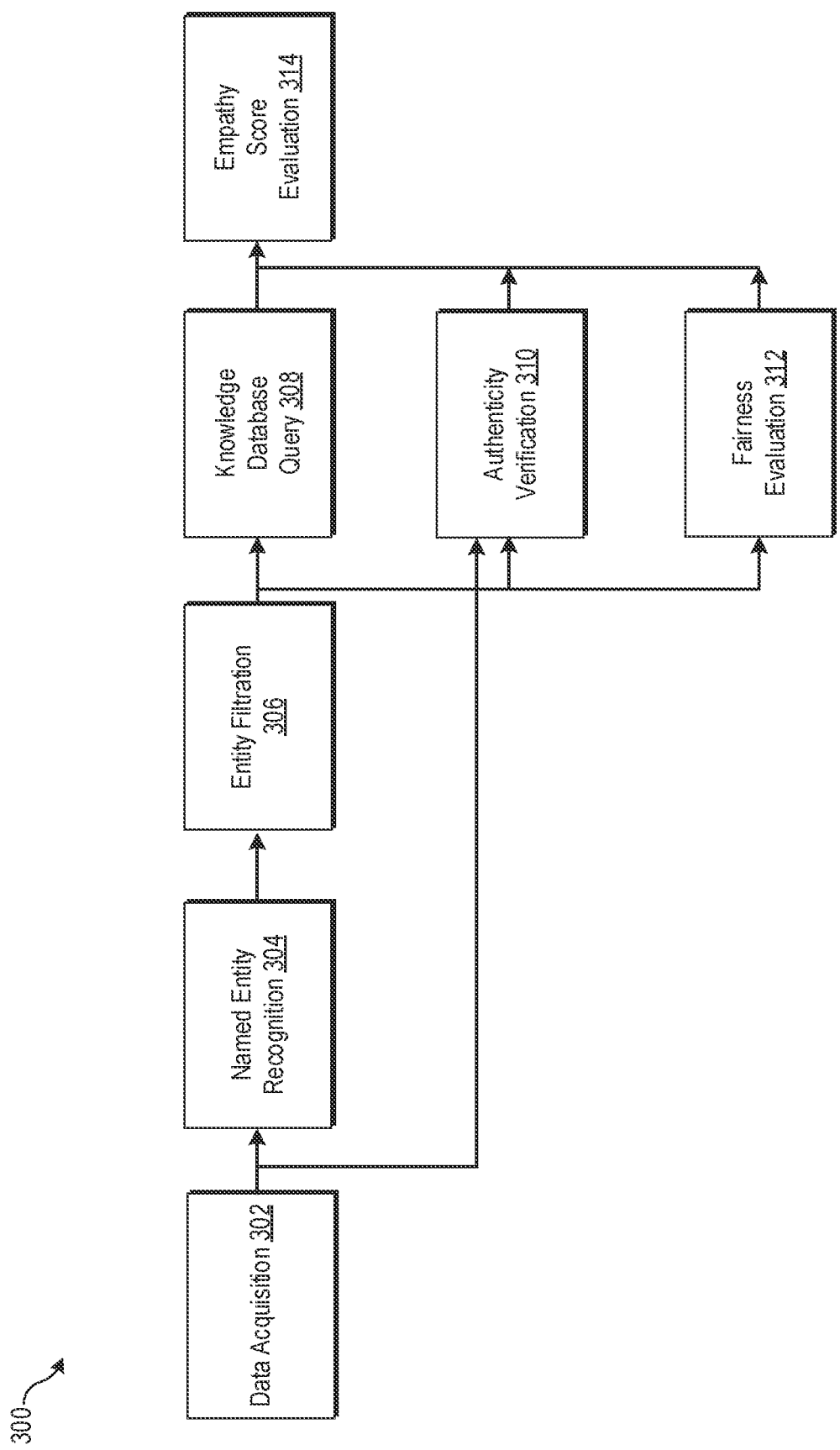
FIG. 3 is a diagram that illustrates an exemplary processing pipeline for automated empathetic assessment of a candidate for a job.

FIG. 3 is a diagram that illustrates an exemplary processing pipeline for automated empathetic assessment of a candidate for a job, in accordance with an embodiment of the disclosure. FIG. 3 is described in conjunction with elements from FIG. 1, and FIG. 2. With reference to FIG. 3, there is shown a processing pipeline 300 of operations from 302 to 314 for empathetic automated assessment of a candidate for a job.

At 302, data may be acquired. In an embodiment, the processor 204 may be configured to acquire data associated with a candidate. The acquired data may include candidate information associated with the candidate whose empathy score is to be determined. As an example, the processor 204 may acquire the first candidate information 120A associated with the first candidate. The first candidate information 120A may include the first document 116A, e.g., a resume document associated with the first candidate. The first candidate information 120A may further include the first profile information 118A, e.g., information associated with at least one of, but not limited to, a job cover-letter, a set of recommendations, a source code repository, a project related page, one or more professional networking webpages, or a social networking webpage, associated with the first candidate. The processor 204 may extract the first candidate information 120A from the candidate information DB 104 and store the extracted first candidate information 120A in the memory 206 and/or the persistent data storage 208. Alternatively, the processor 204 may acquire the first candidate information 120A based on user input.

At 304, a set of named-entities may be recognized. In an embodiment, the processor 204 may be configured to recognize the set of named-entities from the acquired data (obtained at operation 302). Examples of techniques or tools that may be used to recognize the set of named-entities from the acquired data may include, but are not limited to, Nlp.js, spark.js, Stanford NLPcore, or sequence tagging in Tensorflow. Examples of the set of named-entities that may be recognized from the first candidate information 120A may include, but are not limited to, education, certifications, location, marital status, languages known/studied, disability, skillset, age, gender, family/per-capita income, associated with the first candidate.

At 306, the recognized named-entities may be filtered. In an embodiment, the processor 204 may be configured to filter the recognized set of named-entities (obtained at operation 304). The filtration of the recognized set of named-entities may include removal of certain named-entities from the recognized set of named-entities based on a pre-determined rule or user input. Examples of techniques or tools that may be used for filtration of the recognized named-entities may include, but are not limited to, Stanford NLPcore, or sequence tagging in Tensorflow. Examples of the named-entities that may be obtained after the filtration may include, but are not limited to, education, certifications, location, languages known/studied, disability, skillset, age, gender, family/per capita income, associated with the first candidate. In aforementioned example, the marital status of the first candidate may be removed from the recognized set of named-entities as it may not be required for determination of the empathy score associated with the first candidate. In an embodiment, the processor 204 may extract first information about a first set of features associated with the first candidate based on the filtration of the recognized set of named-entities. Examples of the first set of features may include at least one of a set of education degrees, a set of certifications, a number of years of work experience, a location, a set of languages studied or known, a physical disability, a set of skills, an age, a gender, or a per capita income, associated with the first candidate. The extraction of the first information about the first set of features associated with the first candidate is described further, for example, in FIG. 5.

At 308, the one or more databases (e.g., the one or more knowledge DBs 106) may be queried. In an embodiment, the processor 204 may be configured to transmit one or more queries to the one or more databases (i.e., the one or more knowledge DBs 106) based on one or more combinations of the first set of features associated with the first candidate. Based on the transmitted one or more queries, the processor 204 may be configured to extract second information about a second set of features. The second set of features may be associated with a population of candidates with at least one of a set of demographic parameters same as a demographic parameter of the first candidate. The populations of candidates may be candidates different from the first candidate form whom the empathy score is to be determined. The populations of candidates may be selected which may have one or more demographic parameters similar to that of the first candidate. Examples of the set of demographic parameters may include, but are not limited to, a family income, a location, type of institution studied in, educational qualifications, certifications, skillset, family background, resources available, and languages known or studied. Examples of the second set of features may include at least one of, but not limited to, an average per capita income, a set of education degrees, a set of certifications, a number of job applicants, a number of graduates, a number of institutions, a number of jobs secured, or a set of languages studied or known, associated with the population of candidates. The extraction of the second information about the second set of features is described further, for example, in FIG. 6.

At 310, an authenticity of the first information may be verified. In an embodiment, the processor 204 may be configured to verify the authenticity of the first information associated with at least one of the first document 116A, the first profile information 118A (i.e., outputs of operation 302), or the filtered set of named-entities associated with the first candidate (i.e., received at operation 306). The verification of the authenticity of the first information may be based on one or more public information databases (e.g., the one or more public information DBs 108). The verification of the authenticity of the first information is described further, for example, in FIG. 5.

At 312, a fairness associated with an acceptance of the first candidate may be evaluated. In an embodiment, the processor 204 may be configured to evaluate the fairness associated with the acceptance of the first candidate. The processor 204 may be configured to evaluate a criteria that may correspond to a counterfactual criteria (e.g., a counterfactual fairness criteria) associated with the first candidate. The counterfactual criteria may correspond to a criteria such that a first likelihood of acceptance of the first candidate with a first value of a first protected feature of one or more protected features (i.e. among the first set of features) may be same as a second likelihood of acceptance of a second candidate with a second value of the first protected feature. The criteria may be based on a determination that values of others of the first set of features are same. Examples of the one or more protected features may include at least one of, but not limited to, an age, a gender, or a physical disability, associated with the first candidate.

At 314, an empathy score associated with the first candidate may be evaluated. In an embodiment, the processor 204 may be configured to evaluate the empathy score associated with the first candidate, based on outputs from operations 308, 310, and 312. The processor 204 may be configured to determine a third set of features based on a difference of (or deviation between) corresponding features from the first set of features associated with the first candidate and the second set of features (as obtained at operation 308) associated with the population of candidates. The processor 204 may be configured to apply a pre-trained neural network model (e.g., the neural network model 216) on the determined third set of features. The neural network model 216 may be pre-trained to determine the empathy score for different candidates, based on the first set of features associated with such candidates. The training of the neural network model 216 (prior to the determination of the empathy score) is described further, for example, in FIG. 8. Further, the processor 204 may be configured to determine a set of weights associated with the third set of features, based on the application of the pre-trained neural network model 216. The processor 204 may be configured to determine the empathy score associated with the first candidate based on the determined set of weights.

In regards to the verification of the authenticity of the first information (i.e., the output of operation 310), in an embodiment, the processor 204 may end the evaluation or determination of the empathy score of the first candidate in case the first information associated with the first candidate is determined as not valid (or un-authentic). In such case, the first candidate's candidature for the job may be rejected. Such validation check prior to the evaluation of the empathy score associated with the first candidate may ensure that the details (e.g., but not limited to, education, certifications, and skillset) provided by the first candidate are true, valid and not misleading or forged.

In an embodiment, the processor 204 may be configured to apply a regularization constraint on the pre-trained neural network model (e.g., the neural network model 216) based on a criteria associated with the one or more protected features from the first set of features associated with the first candidate. The criteria may correspond to the counterfactual criteria (e.g., the counterfactual fairness criteria, i.e., the output of operation 312). The determination of the empathy score associated with the first candidate may be further based on the application of the regularization constraint on the pre-trained neural network model (e.g., the neural network model 216). The evaluation of the counterfactual criteria and application of the regularization constraint based on the counterfactual criteria are described further, for example, in FIG. 7.

The processor 204 may be further configured to render the determined empathy score associated with the first candidate. The automatic empathetic assessment of a candidate for a job is described further, for example, in FIGS. 4 and 9. Example scenarios for empathy scores determination for two candidates are provided in FIG. 10. An example scenario of a job description and a resume document of a candidate for a job is provided in FIG. 11.

Figure 4:
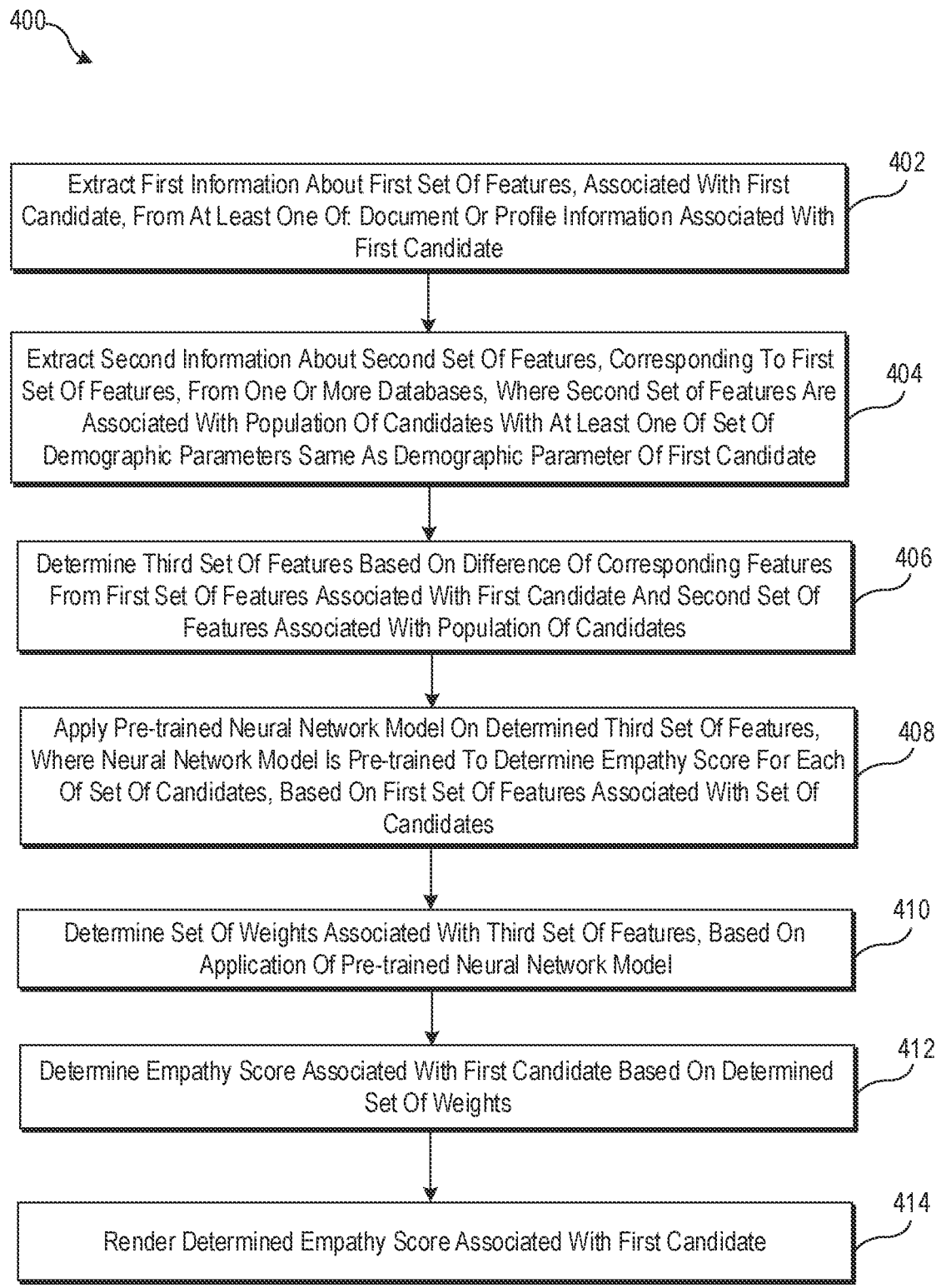
FIG. 4 is a diagram that illustrates a flowchart of an example method for empathetic assessment of a candidate for a job.

FIG. 4 is a diagram that illustrates a flowchart of an example method for empathetic assessment of a candidate for a job, arranged in accordance with at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the first information about the first set of features associated with the first candidate may be extracted from at least one of a document or profile information associated with the first candidate. In an embodiment, the processor 204 may be configured to extract the first information about the first set of features associated with the first candidate from at least one of the document or profile information associated with the first candidate. As an example, the processor 204 may acquire the first candidate information 120A associated with the first candidate. The first candidate information 120A may include the first document 116A, e.g., a resume document associated with the first candidate. The first candidate information 120A may further include the first profile information 118A, e.g., information associated with at least one of, but not limited to, a job cover-letter, a set of recommendations, a source code repository, a project page, a professional networking webpage, or a social networking webpage, associated with the first candidate. The processor 204 may extract the first candidate information 120A from the candidate information DB 104 and store the extracted first candidate information 120A in the memory 206 and/or the persistent data storage 208. Alternatively, the processor 204 may acquire the first candidate information 120A based on user input received from the user-end device 110.

In an embodiment, the processor 204 may be configured to extract a first set of named-entities from at least one of the document (e.g., the first document 116A) or the profile information (e.g., the first profile information 118A) associated with the first candidate. The processor 204 may be further configured to filter the extracted first set of named-entities to extract a second set of named-entities. Further, the processor 204 may be configured to extract the first set of features associated with the first candidate based on removal of the extracted second set of named-entities from the extracted first set of named-entities. Examples of the first set of features may include at least one of, but not limited to, a set of education degrees, a set of certifications, a number of years of work experience, a location, a set of languages studied or known, a physical disability, a set of skills, an age, a gender, or a family/per-capita income, associated with the first candidate. The first information about the first set of features may thereby be extracted. The extracted first information (for example extracted from the first document 116A or from the first profile information 118A) may include different textual information or numeral values related to each of the first set of features. For example, the first information of an education feature may indicate that the first candidate may be a post-graduate or may have a Master's degree. Similarly, the first information of certifications feature may indicate a number of certifications or names of the certifications achieved by the first candidate. In another example, the first information of a language feature may indicate that the first candidate may be an expert in a foreign language. The extraction of the first information is described further, for example, in FIG. 5.

At block 404, the second information about the second set of features, corresponding to the first set of features, may be extracted from one or more databases (e.g., the one or more knowledge DBs 106). In an embodiment, the processor 204 may be configured to extract the second information about the second set of features, corresponding to the first set of features, from the one or more databases (e.g., the one or more knowledge DBs 106). In an embodiment, to extract the second information, the processor 204 may be configured to transmit one or more queries to the one or more databases (i.e., the one or more knowledge DBs 106) based on one or more combinations of the first set of features associated with the first candidate. Based on the transmitted one or more queries, the processor 204 may be configured to extract the second information about the second set of features. The second set of features may be associated with a population of candidates that may have at least one of a set of demographic parameters same as a demographic parameter of the first candidate. Examples of the set of demographic parameters may include, but are not limited to, a family income, a location, type of institution studied in, educational qualifications, certifications, skillset, family background, resources available, and languages known or studied. For example, the population of candidates may include candidates in the same location or region as the first candidate. In another example, the population of candidates may include candidates having a similar family income (e.g., a total family income of the candidates may be substantially close or similar to the family income of the first candidate). In another example, the population of candidates may include candidates that may have similar qualification or may be studied in same type (or tier) of institution which may be same as that of the first candidate for whom the empathy score is to be determined. Examples of the second set of features may include at least one of, but not limited to, an average per capita income, a set of education degrees, a set of certifications, a number of job applicants, a number of graduates, a number of institutions, a number of jobs secured, or a set of languages studied or known, associated with the population of candidates. The extraction of the second information about the second set of features is described further, for example, in FIG. 6.

At block 406, the third set of features may be determined based on a difference of corresponding features from the first set of features associated with the first candidate and the second set of features associated with the population of candidates. In an embodiment, the processor 204 may be configured to determine the third set of features based on the difference of (i.e. or deviation between) corresponding features from the first set of features associated with the first candidate and the second set of features associated with the population of candidates. As an example, the first set of features associated with the first candidate may be denoted by a first feature vector, for example, $c=[c_1, c_2, c_3, \ldots c_n]$, where $c_i$ may represent an individual feature in the first set of features associated with the first candidate. Further, the second set of features associated with the population of candidates may be denoted by a second feature vector, for example, $p=[p_1, p_2, p_3, \ldots, p_n]$, where $p_i$ may represent an individual feature in the second set of features associated with the population of candidates. The processor 204 may be configured to normalize each feature in the first set of features and in the second set of features based on an encoding to represent the specific feature in the corresponding vector form. For example, categorical features (such as, a set of educational qualifications, a set of certifications, and a skillset) may be converted into one hot vectors.

The individual features of the second set of features may be denoted by the second feature vector (i.e., p), such that each individual feature in the second set of features may be aligned with the corresponding features of the first set of features denoted by the first feature vector (i.e., c). As an example, in the first feature vector c, $c_1$ may represent a set of education degrees, $c_2$ may represent a set of certifications, $c_3$ may represent a set of languages studied/known, $c_4$ may represent a set of skills, . . . and $c_n$ may represent a family income, associated with the first candidate. Further, in the second feature vector p, $p_1$ may represent average education qualifications, $p_2$ may represent average certifications, $p_3$ may represent average set of languages studied/known, $p_4$ may represent an average skillset, . . . and $p_n$ may represent an average family income, associated with the population of candidates. The processor 204 may be configured to determine the third set of features as a difference (or deviation) between the corresponding features in the first feature vector and the second feature vector. As an example, a third feature vector, $m=[m_1, m_2, m_3, \ldots m_n]$ may be determined, as $m=c-p$ (i.e., $m_i=c_i-p_i$). In an embodiment, a higher difference between the corresponding/related features of the first feature vector (i.e. related to the first candidate) and the second feature vector (i.e. related to the population of candidates may be an indicative of a greater skill acquiring ability or hard working ability of the first candidate over the population of candidates. For example, if the first candidate has an undergraduate degree (i.e. first information of one of the first set of features), and the average education of the population of candidates (say in same region of the first candidate) is just high school (i.e. second information of one of the second set of features), then the difference or deviation between the corresponding feature may be higher to indicate that the first candidate may have a good skill set, worked really hard or may worked out of the way to achieve undergraduate skills, in comparison to the population of candidates of same demographics (like same region). Therefore, in such case, the empathy score or given weightage for the first candidate may be higher. Certain examples of the empathy scores for different candidates may be provided, for example, in FIGS. 10 and 11.

At block 408, the pre-trained neural network model (e.g., the neural network model 216) may be applied on the determined third set of features. In an embodiment, the processor 204 may be configured to apply the pre-trained neural network model 216 on the determined third set of features (as denoted by the third feature vector, m). As an example, the processor 204 may input the third feature vector (i.e., m) to the input layer of the neural network model 216, to apply the neural network model 216 on the determined third set of features. In an embodiment, the neural network model 216 may be pre-trained to determine the empathy score for each of a set of candidates, based on the first set of features associated with the set of candidates. The first of features associated with the set of candidates may be a training dataset of the neural network model 216. The training of the neural network model 216 is described further, for example, in FIG. 8.

At block 410, a set of weights associated with the third set of features may be determined, based on the application of the pre-trained neural network model 216. In an embodiment, the processor 204 may be configured to determine the set of weights associated with the third set of features, based on the application of the pre-trained neural network model 216. As an example, the pre-trained neural network 216 may be configured to learn a convex combination of individual features (i.e., $m_i$) denoted by the third feature vector (i.e., m), to obtain the empathy score associated with the first candidate. The pre-trained neural network model 216 may thereby learn relative importance of each individual feature (i.e., $m_i$) of the third set of features and accordingly determine a value for the corresponding weight. For example, a higher weight may be assigned to more important feature and so on. The convex combination of the individual features (i.e., $m_i$) of the third feature vector (i.e., m), which may be learnt by the pre-trained neural network model 216, may be represented by expression (1), as follows:

$$w_1.m_1+w_2.m_2+w_3.m_3+ \ldots +z_n.m_n \qquad (1)$$

where, $w_1, w_2, w_3, \ldots w_n$ are weights corresponding to features $m_1$, $m_2, m_3, \ldots m_n$ respectively;

$w_1+w_2+w_3+ \ldots +w_n=1$ (which is a condition for convex combination); and $w_1, w_2, w_3, w_n>=0$ (which is another condition for convex combination).

In an embodiment, the set of weights associated with the third set of features may be determined based on an output of a penultimate layer of the pre-trained neural network model 216. The penultimate layer of the pre-trained neural network model 216 may output a vector of real-valued scores. Each weight of the set of weights associated with the third set of features may be determined based on the real-valued score that may be output from a respective node of the penultimate layer of the pre-trained neural network model 216.

At block 412, the empathy score associated with the first candidate may be determined based on the determined set of weights. In an embodiment, the processor 204 may be configured to determine the empathy score associated with the first candidate based on the determined set of weights. For example, the final layer of the pre-trained neural network model 216 may include a normalization layer, such as, a softmax layer. The pre-trained neural network model 216 may determine the empathy score associated with the first candidate at the final layer based on the normalization of the weighted sum of the third feature vector (based on weighted sum in the expression (1)).

At block 414, the determined empathy score associated with the first candidate may be rendered. In an embodiment, the processor 204 may be configured to render the determined empathy score associated with the first candidate. The processor 204 may display the determined empathy score associated with the first candidate along with the first candidate information 120A (including the first document 116A and the first profile information 118A) to the user 114 on the display screen 212. The displayed empathy score, along with the first candidate information 120A associated with the first candidate may enable assessment of the first candidate for a job. One or more other automated techniques/tools may be further used or manual analysis may be performed to assess the first candidate, based on the determined empathy score and the first candidate information 120A. Control may pass to end.

Although the flowchart 400 is illustrated as discrete operations, such as 402, 404, 406, 408, 410, 412, and 414. However, in certain embodiments, such discrete operations may be further divided into additional operations, combined into fewer operations, or eliminated, depending on the particular implementation without detracting from the essence of the disclosed embodiments.

Figure 5:
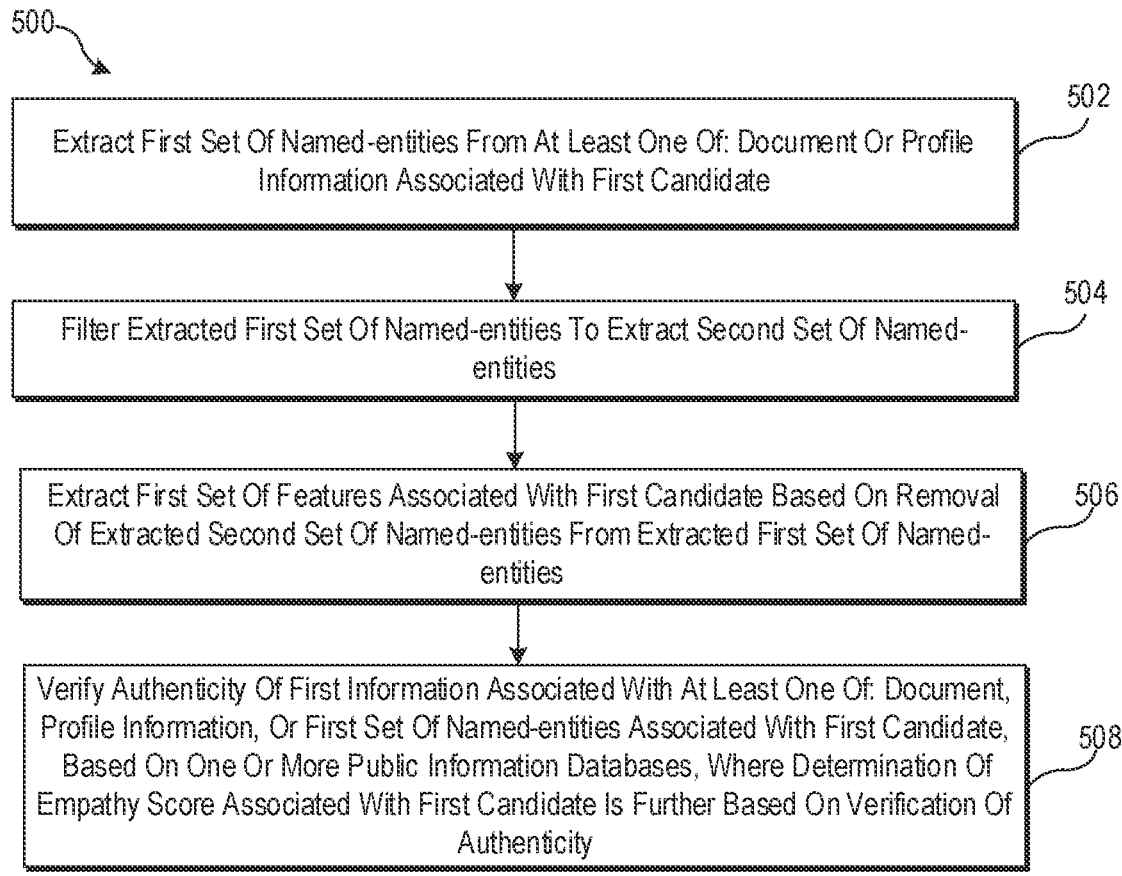
FIG. 5 is a diagram that illustrates a flowchart of an example method for extraction and verification of first information associated with a first candidate.

FIG. 5 is a diagram that illustrates a flowchart of an example method for extraction and verification of first information associated with a first candidate, arranged in accordance with at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or the processor of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, the first set of named-entities may be extracted from at least one of a document (e.g., the first document 116A) or profile information (e.g., the first profile information 118A) associated with the first candidate. In an embodiment, the processor 204 may be configured to extract the first set of named-entities from at least one of the document (e.g., the first document 116A) or the profile information (e.g., the first profile information 118A) associated with the first candidate. Examples of techniques or tools that may be used for the extraction of the first set of named-entities from the first document 116A or the first profile information 118A may include, but are not limited to, Nlp.js, spark.js, Stanford NLPcore, or sequence tagging in Tensorflow. Examples of the extracted first set of named-entities may include, but are not limited to, education, certifications, location, marital status, languages known/studied, disability, skillset, age, gender, family/per-capita income, associated with the first candidate.

At block 504, the extracted first set of named-entities may be filtered to extract the second set of named-entities. In an embodiment, processor 204 may be configured to filter the extracted first set of named-entities to extract the second set of named-entities. In an embodiment, the filtration of the extracted first set of named-entities may be based on a pre-determined rule or user input (i.e. received from the user 114). Examples of the techniques or tools that may be used for filtration of the extracted first set of named-entities may include, but are not limited to, Stanford NLPcore, or sequence tagging in Tensorflow. In an example, the marital status of the first candidate may be filtered from the exemplary first set of named-entities (as mentioned in block 502) and extracted as the second set of named-entities.

At block 506, the first set of features associated with the first candidate may be extracted based on removal of the extracted second set of named-entities from the extracted first set of named-entities. In an embodiment, the processor 204 may be configured to extract the first set of features associated with the first candidate based on removal of the extracted second set of named-entities from the extracted first set of named-entities. In an example, as mentioned in block 504, for example, the marital status (i.e. extracted as the second set of named-entities) of the first candidate may be filtered from the first set of named-entities. In other words, the second set named-entities (i.e., the entity, "marital status") may be removed from the first set of named-entities. The removal of the second set of named-entities may ensure that information (such as, marital status) that may not be relevant (or may not be influential) for the empathy score, may be removed from the process for the empathy score determination. This may avoid biases and unexpected results (for example biasing based on the marital status). Based on the removal of the second set of named-entities from the first set of named-entities, the first set of features may be extracted and thereby the first information about the first set of features may be extracted. Examples of the first set of features may include at least one of a set of education degrees, a set of certifications, a number of years of work experience, a location, a set of languages studied or known, a physical disability, a set of skills, an age, a gender, or a family/per-capita income, associated with the first candidate.

At block 508, an authenticity of the first information associated with at least one of the document, the profile information, or the first set of named-entities, associated with the first candidate, may be verified. In an embodiment, the processor 204 may be configured to verify the authenticity of the first information associated with at least one of the document (e.g., first document 116A), the profile information (e.g., the first profile information 118A), or the first set of named-entities related to the first candidate. The verification of the authenticity of the first information may be based on relevant information extracted or checked from one or more public information databases (e.g., the one or more public information DBs 108). For example, the processor 204 may verify the authenticity of information (i.e. first information) about the education degrees and the certifications associated with the first candidate from the one or more public information DBs 108. Examples of such one or more public information DBs 108 may include, but are not limited to, records or database of a college/university, or an education records database of a school. The authenticity of education details associated with the first candidate such as, clearing of a course, obtaining a certain grade, or obtaining certain certifications may be verified based on the records or database of the college/university or the education records database of the school. Further, the processor 204 may verify the authenticity of information associated with the work experience and the skillset of the first candidate from the one or more public information DBs 108. The examples of such one or more public information DBs 108 may include, but are not limited to, a job portal database or a human resource (HR) database of an organization in which the first candidate worked. In an example, the one or more public information DBs 108 to verify language, age, or gender, may include records of police department, record of birth related department, or records of departments which may track locations of humans for security and surveillance. In an embodiment, the processor 204 may be configured to send the first information related to each of the first set of features may be transmitted to an computing device or a server related to the one or more public information DBs 108, and further receive information related to the verification of the transmitted first information from the corresponding one or more public information DBs 108.

In an embodiment, the determination of the empathy score associated with the first candidate may be further based on the verification of the authenticity of the first information. In an embodiment, the processor 204 may end the evaluation or determination of the empathy score (as described, for example, in FIGS. 3 and 4) of the first candidate in case the first information associated with the first candidate is determined as not valid or unauthenticated. In such case, the first candidate's candidature for the job may be rejected. This validation check prior to the evaluation of the empathy score associated with the first candidate may ensure that the details (e.g., education, work experience, certifications, skillset, age. Gender, or location) provided by the first candidate are true and not misleading or forged. Control may pass to end.

Although the flowchart 500 is illustrated as discrete operations, such as 502, 504, 506, and 508. However, in certain embodiments, such discrete operations may be further divided into additional operations, combined into fewer operations, or eliminated, depending on the particular implementation without detracting from the essence of the disclosed embodiments.

Figure 6:
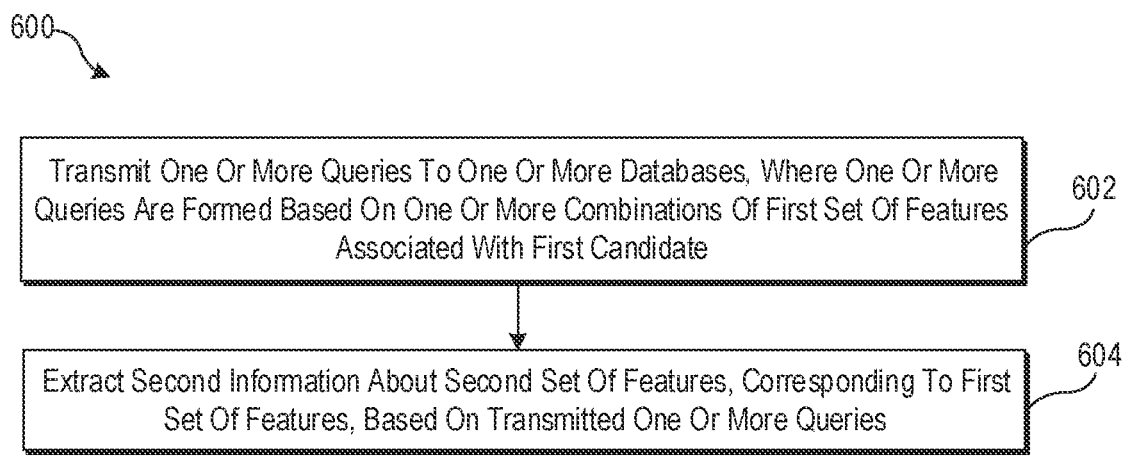
FIG. 6 is a diagram that illustrates a flowchart of an example method for extraction of second information associated with a population of candidates.

FIG. 6 is a diagram that illustrates a flowchart of an example method for extraction of second information associated with a population of candidates, arranged in accordance with at least one embodiment described in the present disclosure. FIG. 6 is explained in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, the one or more queries may be transmitted to one or more databases (e.g., the one or more knowledge DBs 106). In an embodiment, the processor 204 may be configured to transmit the one or more queries to the one or more databases (e.g., the one or more knowledge DBs 106). The one or more knowledge DBs 106 may include, but are not limited to, a census database, a municipal corporation database, an economic survey database, or a job portal database. The one or more queries may be formed based on one or more combinations of the first set of features associated with the first candidate. For example, the one or more queries may be formed based on one or more combinations of a pair of features from the first set of features associated with the first candidate. As an example, a first query from the one or more queries may be formed based on a first combination of the first set of features, such as, a location and an institution of the first candidate. In another example, a second query from the one or more queries may be formed based on a second combination of the first set of features, such as, a location including a sub-district (or municipal area), and a gender of the first candidate. In a scenario where the first set of features includes five features and the one or more queries are formed based on one or more combinations of pairs of features in the first set of features, then ten different queries (i.e., $^5C_2=10$) may be formed as the one or more queries. The formation of the multiple queries based on the one or more combination of features in the first set of features may increase a reliability and a robustness of the extraction of the second information. In an embodiment, the transmitted queries may correspond to search queries based on which the one or more knowledge DBs 106 may search or retrieve information (such as the second information about the second set of features) based on received queries.

At block 604, the second information about the second set of features corresponding to the first set of features may be extracted, based on the transmitted one or more queries. In an embodiment, the processor 204 may be configured to extract the second information about the second set of features, based on the transmitted one or more queries to the one or more knowledge DBs 106. The second set of features may be associated with the population of candidates with at least one of a set of demographic parameters same as a demographic parameter associated with the first candidate. Examples of the set of demographic parameters may include, but are not limited to, a family income, a location, type of institution studied in, educational qualifications, certifications, skillset, family background, resources available, and languages known or studied. For example, the population of candidates may be from a same location and may have studied from a same educational institution or same type of educational institution (e.g., same tier of educational institution) as the first candidate. In such example, the location and the education (or educational institute) from the first set of features may be formed as a query which may be transmitted to the one or more knowledge DBs 106 to further extract the second information (i.e. such as information about the population of candidates that may match with the transmitted query). The second information about each of the second set of features may be corresponding or similar to the first set of features of the first candidate. In other words, all the features extracted about the first candidate from the candidate information DB 104 may be extracted from the one or more knowledge DBs 106 about the population of candidates, where the one or more features of the population of candidates may match with the transmitted query or retrieved based on the query. In another example, the population of candidates may be from a same location and may belong to a same sub-district (or municipal area) as the first candidate. The second set of features may include at least one of, but not limited to, an average per capita income, a set of education degrees, a set of certifications, a number of job applicants, a number of graduates, a number of institutions, a number of jobs secured, a set of languages studied or known, associated with the population of candidates. Therefore, the one or more knowledge DBs 106 may provide population level statistics for a particular demographic (like location, region, institution, age, etc of the first candidate), where the population level statistics may include information related to, but not limited to, average employment rate, average income of household, a number of educational institution available, an average education degree, an average number of languages studied/known, etc by the population of candidates with same demographics as the first candidate. In other words, the second information extracted from the one or more knowledge DBs 106 may provide average statistics about the population (or variety) of candidates which may have same demographic (like same region, e.g. city or state) as the first candidate for whom empathy score is to be determined. Further due to different queries (i.e. formed based on the combination of different features in the first set of features), different segment of candidates population may be targeted, and further related second information about the targeted population may be retrieved from the one or more knowledge DBs 106. This may further increase the robustness of the disclosed system to target the relevant population of candidates to be compared with the first candidate for determination of the empathy score. The difference or comparison between the first set of features of the first candidate and the second set of features about the population of candidates is further described, for example, at block 406 in FIG. 4. Control may pass to end.

Although the flowchart 600 is illustrated as discrete operations, such as 602, 604. However, in certain embodiments, such discrete operations may be further divided into additional operations, combined into fewer operations, or eliminated, depending on the particular implementation without detracting from the essence of the disclosed embodiments.

Figure 7:
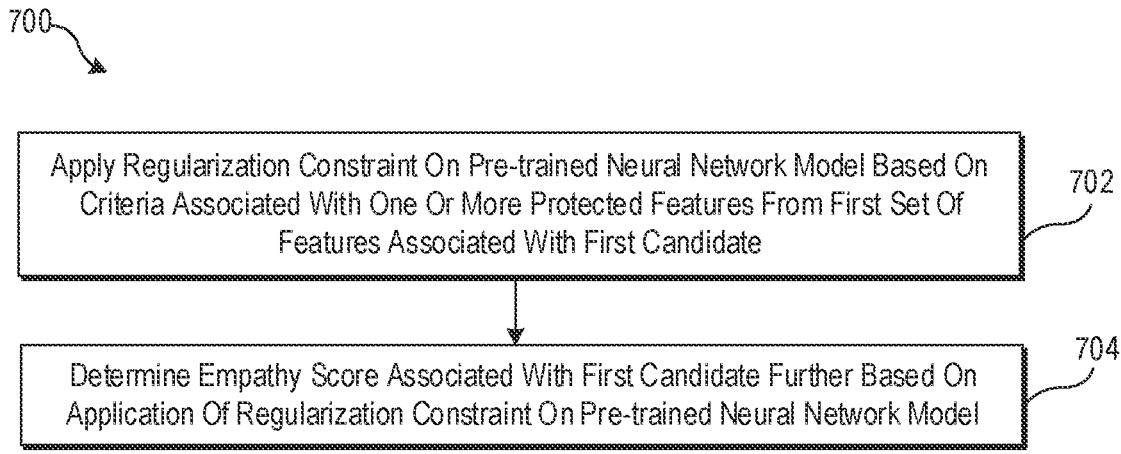
FIG. 7 is a diagram that illustrates a flowchart of an example method for empathy score determination based on a counterfactual criteria.

FIG. 7 is a diagram that illustrates a flowchart of an example method for empathy score determination based on a counterfactual criteria, arranged in accordance with at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a regularization constraint may be applied on the pre-trained neural network model 216 based on a criteria associated with one or more protected features from the first set of features associated with the first candidate. In an embodiment, the processor 204 may be configured to apply the regularization constraint on the pre-trained neural network model 216 based on the criteria associated with the one or more protected features from the first set of features associated with the first candidate. In an embodiment, the criteria may correspond to a counterfactual criteria (e.g., a counterfactual fairness criteria) such that a first likelihood of acceptance of the first candidate with a first value of a first protected feature of the one or more protected features may be same as a second likelihood of acceptance of a second candidate with a second value of the first protected feature. The criteria may be based on a determination that values of others of the first set of features for the first candidate and the second candidate are same. Examples of the one or more protected features may include at least one of, but not limited to, an age, a gender, or a physical disability, associated with the first candidate. The counterfactual criteria may be represented in expression (2), as follows:

$$P(\hat{Y}_{A \leftarrow a}(U)=y|X=x,A=a)=P(\hat{Y}_{A \leftarrow a'}(U)=y|X=x,A=a) \quad (2)$$

for any value of y and for any value a' attainable by A; where,

A may represent the one or more protected features;

a and a' may represent the first value and the second value of a first protected feature from the one or more protected features;

X may represent remaining features other than the one or more protected features from the first set of features;

x may represent a value of a remaining feature other than the one or more protected features;)

$\hat{Y}$ may represent an event of selection (i.e., acceptance) or rejection of a candidate (e.g., the first candidate);

y may represent an outcome of the event $\hat{Y}$; and

U may represent the candidate (e.g., the first candidate);

P(.) may represent a probability.

In an example, considering gender as the first protected feature of the first candidate. Based on the counterfactual criteria, a probability (i.e. first likelihood) of a selection of the first candidate (i.e. if the first candidate is a female candidate (i.e. the first value)) may be equal to a probability (i.e. second likelihood) of selection of the second candidate (i.e. if the second candidate is a male candidate (the second value)), considering other features of the first set of features of the first candidate and the second candidate to be the same. The counterfactual criteria may be applied as a regularization constraint to the pre-trained neural network model 216. The application of the counterfactual criteria as the regularization constraint may ensure that the determination of the empathy score of the first candidate may be fair with regards to the one or more protected features of the first candidate.

At block 704, the empathy score associated with the first candidate may be determined further based on the application of the regularization constraint on the pre-trained neural network model 216. In an embodiment, the processor 204 may be configured to determine the empathy score associated with the first candidate based further on the application of the regularization constraint on the pre-trained neural network model 216. The processor 204 may use the expression (1) (i.e. learnt by the pre-trained neural network model 216 as mentioned in FIG. 4) and use the expression (2), to determine the empathy score, based on expression (3), as follows:

$$w_1.m_1+w_2.m_2+w_3.m_3+ \ldots w_n m_n \quad (3)$$

$$+s.P(\hat{Y}_{A \leftarrow a}(U)=y=|X=x,A=a)=P(\hat{Y}_{A \leftarrow a}(U)=y|X=x, A=a)$$

where, s may represent a heuristically set standard value (e.g., s=0.0001)

Thus, based on the expression (3), the counterfactual criteria may be incorporated into the determination of the empathy score as the regularization constraint applied on the pre-trained neural network model 216, and accordingly, the empathy score associated with the first candidate may be determined. Control may pass to end.

Although the flowchart 700 is illustrated as discrete operations, such as 702, 704. However, in certain embodiments, such discrete operations may be further divided into additional operations, combined into fewer operations, or eliminated, depending on the particular implementation without detracting from the essence of the disclosed embodiments.

Figure 8:
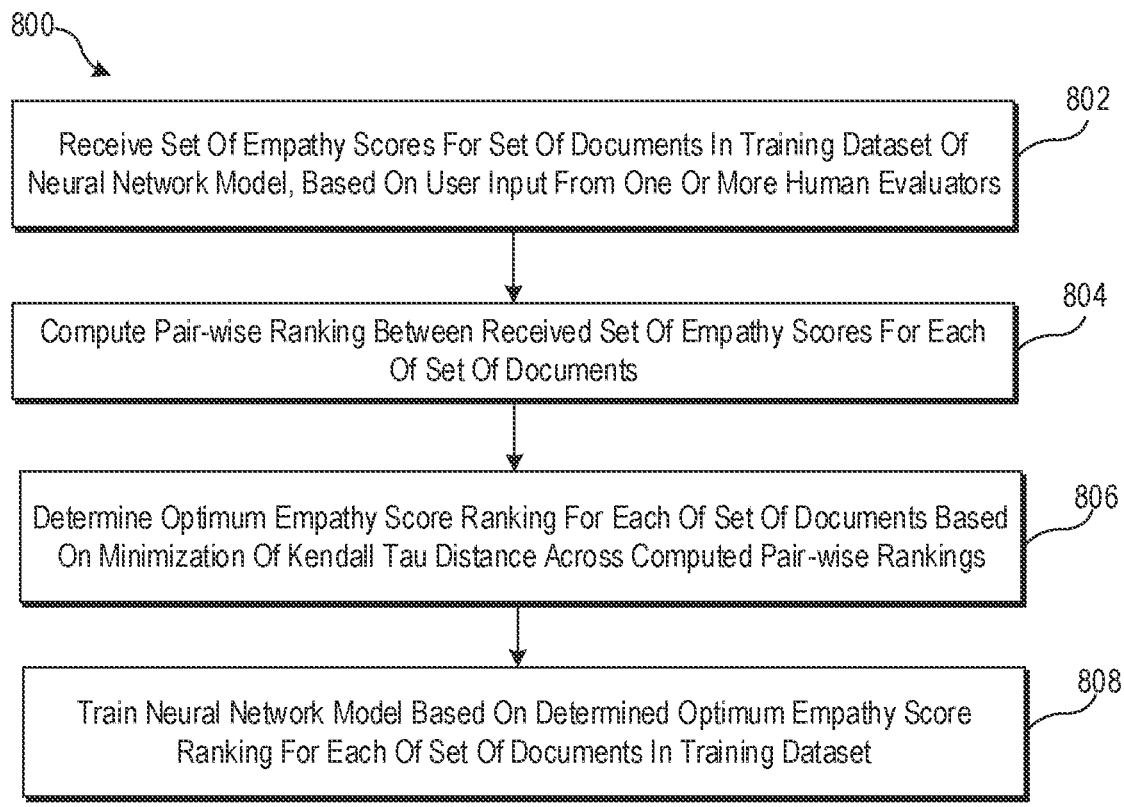
FIG. 8 is a diagram that illustrates a flowchart of an example method for training of a neural network model based on each of a set of documents assigned with an empathy score by a set of human evaluators.

FIG. 8 is a diagram that illustrates a flowchart of an example method for training of a neural network model based on each of a set of documents assigned with an empathy score by a set of human evaluators, arranged in accordance with at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a set of empathy scores may be received for a set of documents in a training dataset of the neural network model 216, based on user input from one or more human evaluators. In an embodiment, the processor 204 may be configured to receive the set of empathy scores for the set of documents in the training dataset of the neural network model 216, based on the user input from one or more human evaluators. The set of documents may include a set of resume documents or a set of curriculum vitae documents, associated with the set of candidates (i.e. different from the first candidate for whom the empathy score is to be determined). The user input from the one or more human evaluators may include a tag or a label assigned to each of the set of documents. The tag or label assigned to a document of a candidate may correspond to the empathy score assigned to the corresponding candidate by a particular human evaluator, based on information present in the document of the candidate. However, the empathy score (i.e., the tag) assigned to each of the set of documents (i.e. manually by the one or more human evaluators) may be prone to biases, as a human evaluator's individual opinion may be subject to biases or uncertainty. In an embodiment, the processor 204 may be configured to aggregate the individual opinion (i.e., the empathy score assigned to the set of documents) associated with each of the set of human evaluators based on an optimal fusion technique (as described in the following operation steps 804-806 of FIG. 8).

At block 804, a pair-wise ranking may be computed between the received set of empathy scores for each of the set of documents. In an embodiment, the processor 204 may be configured to compute the pair-wise ranking between the received set of empathy scores for each of the set of documents. For example, let "A" denote a set of "m" alternatives of an empathy score assigned to a document by the set of human evaluators. Further, let "$\mathcal{L}$ (A)" denote the set of rankings of the alternatives. For $\sigma \in \mathcal{L}$ (A), let a$>_\sigma$ b denote that a first alternative "a" (i.e., a first value of the empathy score for the document) may be preferred over (or have a higher ranking than) a second alternative "b" (i.e., a second value of the empathy score for the document) in "$\sigma$". In an embodiment, the pair-wise ranking between the first alternative "a" and the second alternative "b" may be computed based on a number of human evaluators who provide the first value of the empathy scores corresponding to the first alternative "a" and a number of human evaluators who provide the second value of the empathy score corresponding to the second alternative "b".

At block 806, an optimum empathy score ranking may be determined for each of the set of documents based on a minimization of a Kendall Tau distance across the computed pair-wise rankings. In an embodiment, the processor 204 may be configured to determine the optimum empathy score ranking for each of the set of documents based on a minimization of the Kendall Tau distance across the computed pair-wise rankings. For example, let uncertain input preferences (i.e., the empathy scores assigned to the document) of a human evaluator (i.e., a human evaluator "i") may be a distribution over rankings (e.g., $D_i$) from which the human evaluator's actual preferences (i.e., $\sigma_i$) may be drawn. Let "$\Delta(\mathcal{L}$ (A))" denote a set of distributions over rankings of alternatives in "A". A voting rule, such as, a function f:$\Delta(\mathcal{L}$ (A))$^n \rightarrow \Delta(\mathcal{L}$ (A)) (where n may be a number of evaluators in the set of human evaluators) may be used to aggregate the uncertain empathy scores that may be assigned to the document by the set of human evaluators into a social ranking. Herein, an objective function (i.e., h($\sigma$)) may be represented by expression (4), as follows:

$$h(\sigma) = \mathbb{E}_{\sigma_i \sim D_i, \forall i \in [n]} \sum_{i=1}^{n} d_{KT}(\sigma, \sigma_i) \tag{4}$$

where,
$\mathbb{E}$ may represent expected value; and
$d_{KT}$ may represent Kendell distance.

The objective function, represented in expression (4) may be simplified and represented by expressions (5A) and (5B), as follows:

$$h(\sigma) = \sum_{i=1}^{n} \mathbb{E}_{\sigma_i \sim D_i} \sum_{a,b \in A: a >_\sigma b} \mathbb{I}[b >_{\sigma_i} a] \tag{5A}$$

$$h(\sigma) = \sum_{a,b \in A: a >_\sigma b} \sum_{i=1}^{n} \mathbb{E}_{\sigma_i \sim D_i}[\mathbb{I}[b >_{\sigma_i} a]] \tag{5B}$$

where,
$\mathbb{I}$ may represent an indicator function.

The objective function, which is represented in expression (4) and simplified in expressions (5A) and (5B), may be an expected sum of Kendell distances from the uncertain input preferences of the set of human evaluators. In the expression (5B), $\mathbb{E}_{\sigma_i \sim D_i}[\mathbb{I}[b >_{\sigma_i} a]]$ may equal $Pr_{D_i}[b> a]$, which may be a probability that a human evaluator prefers the second alternative "b" over the first alternative "a". The processor 204 may determine an optimal ranking (i.e., $\sigma_{OPT}$), based on the minimization of the objective function. The optimal ranking may be represented by expression (6), as follows:

$$\sigma_{OPT} = argmin_{\sigma \in \mathcal{L}(A)} \ h(\sigma) \tag{6}$$

The optimal ranking, as represented by expression (6), may be a minimum ranking associated with the uncertain input preferences (e.g., the empathy scores assigned to the document) of the set of human evaluators. The optimum ranking may thereby be the optimum empathy score ranking.

At block 808, the neural network model 216 may be trained based on the determined optimum empathy score ranking for each of the set of documents in the training dataset. In an embodiment, the processor 204 may be configured to train the neural network model 216 based on the determined optimum empathy score ranking for each of the set of documents in the training dataset. As an example, the processor 204 may determine an optimum value of the empathy score for each of the set of documents in the training dataset based on the determined optimum empathy score ranking. Further, the processor 204 may be configured to extract the first set of features associated with each of the set of candidates based on the set of documents. The extraction of the first set of features based on a document is described, for example, in FIG. 5. Based on the optimum value of the empathy score for each of the set of documents in the training dataset and the determined first set of features for each of the set of candidates, the processor 204 may train the neural network model 216 to determine the empathy score associated with a candidate using the first set of features of the candidate. Control may pass to end. The training of the neural network model 216 may be described, for example, in FIG. 1.

Although the flowchart 800 is illustrated as discrete operations, such as 802, 804, 806, and 808. However, in certain embodiments, such discrete operations may be further divided into additional operations, combined into fewer operations, or eliminated, depending on the particular implementation without detracting from the essence of the disclosed embodiments.

Figure 9:
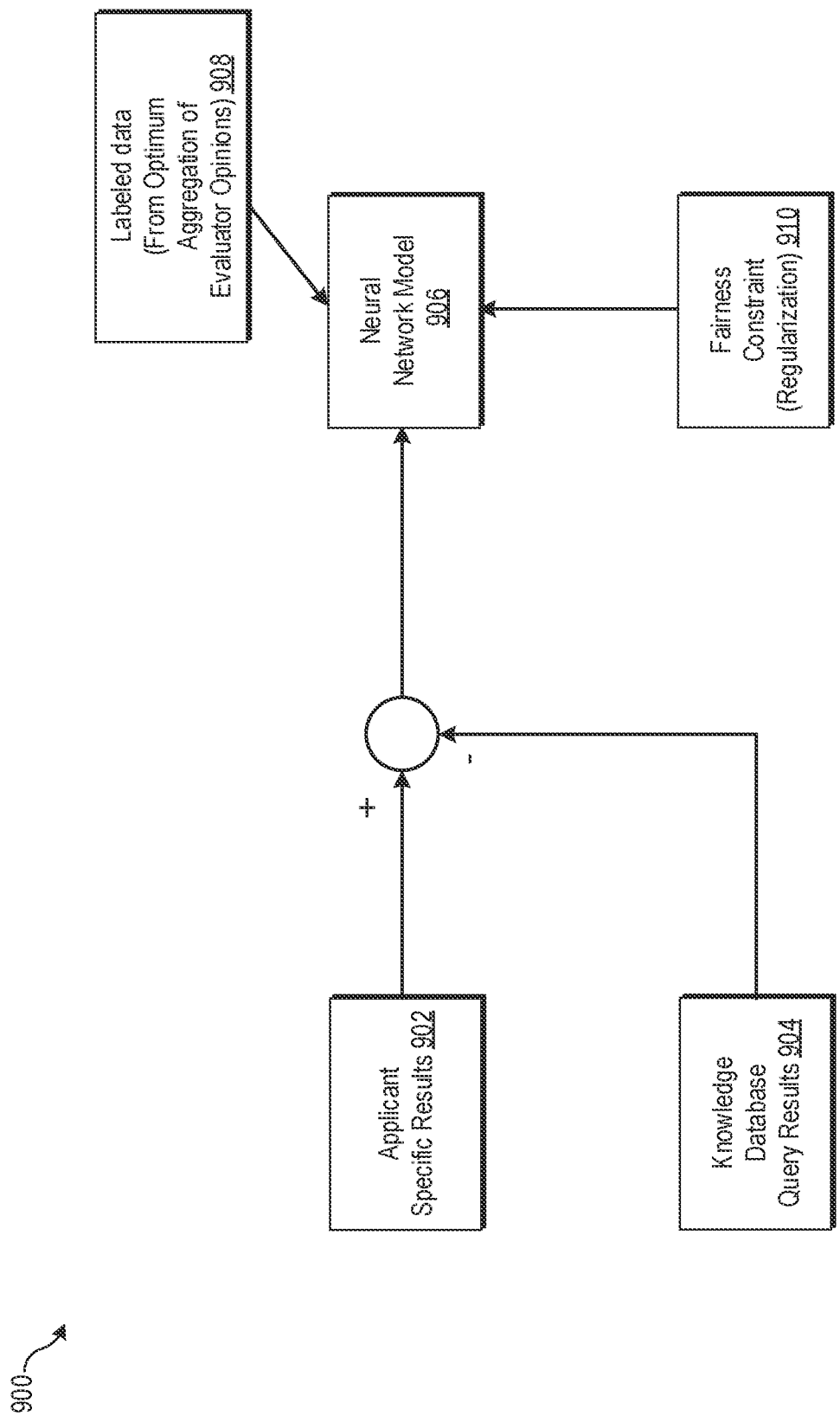
FIG. 9 is a diagram that illustrates an example scenario of determination of empathy score associated with a first candidate.

FIG. 9 is a diagram that illustrates an example scenario of determination of empathy score associated with a first candidate, arranged in accordance with at least one embodiment described in the present disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an example scenario 900. The example scenario 900 includes application specific results 902, knowledge database query results 904, a neural network model 906, labeled data 908, and a fairness constraint 910.

The application specific results 902 may include the first information about the first set of features associated with the first candidate. The processor 204 may extract the application specific results 902 from the first candidate information 120A including the first document 116A and the first profile information 118A, associated with the first candidate. The extraction of the application specific results 902 is described, for example, in FIGS. 3, 4, and 5.

The knowledge database query results 904 may include the second information about the second set of features corresponding to the first set of features. The second set of features may be associated with the population of candidates with at least one of a set of demographic parameters same as a demographic parameter of the first candidate. The processor 204 may extract the knowledge database query results 904 (i.e. the second information about the second set of features) from the one or more knowledge DBs 106, based on the one or more queries formed from the one or more combinations of the first set of features. The extraction of the knowledge database query results 904 based on the transmitted one or more queries is described, for example, in FIGS. 3, 4, and 6.

The neural network model 906 may correspond to the neural network model 216. The neural network model 906 may be trained to determine the empathy score associated with a candidate based on the labeled data 908. The labeled data 908 may be received from the set of human evaluators. The labeled data 908 may include the set of documents associated with the set of candidates, assigned empathy scores to the set of documents of the set of candidates (i.e. assigned by the set of human evaluators), and an optimum empathy score assigned to each of the set of candidates, based on user inputs of the set of human evaluators. The training of the neural network model 906 may be based on an optimum fusion technique, as described, for example, in FIG. 8.

The fairness constraint 910 may include the criteria associated with the one or more protected features from the first set of features associated with the first candidate. The criteria may correspond to the counterfactual criteria such that a first likelihood of acceptance of the first candidate with a first value of a first protected feature of the one or more protected features may be same as a second likelihood of acceptance of a second candidate with a second value of the first protected feature. The criteria may be based on a determination that values of others of the first set of features are same.

In an embodiment, the processor 204 may be configured to determine a difference of the application specific results 902 and the knowledge database query results 904, as shown in FIG. 9. The difference may correspond to the third set of features. The determination of the third set of features is described, for example, in FIGS. 3 and 4. The processor 204 may feed the difference to the pre-trained neural network model 906 to apply the neural network model 906 on the third set of features. As described in the aforementioned, the neural network model 906 may be trained based on the labeled data 908. The processor 204 may determine the set of weights associated with the third set of features based on the application of the pre-trained neural network model 906. The processor 204 may be configured to determine the empathy score associated with the first candidate based on the determined set of weights. In an embodiment, the processor 204 may be configured to apply the fairness constraint 910 as a regularization constraint on the pre-trained neural network model 906. The determination of the empathy score associated with the first candidate may be further based on the application of the regularization constraint (i.e., the fairness constraint 910) on the pre-trained neural network model 906. The processor 204 may be configured to render the determined empathy score associated with the first candidate. The determination of the empathy score is described further, for example, in FIGS. 3, 4, and 7.

It may be noted that the scenario 900 shown in FIG. 9 is presented merely as example and should not be construed to limit the scope of the disclosure.

Figure 10:
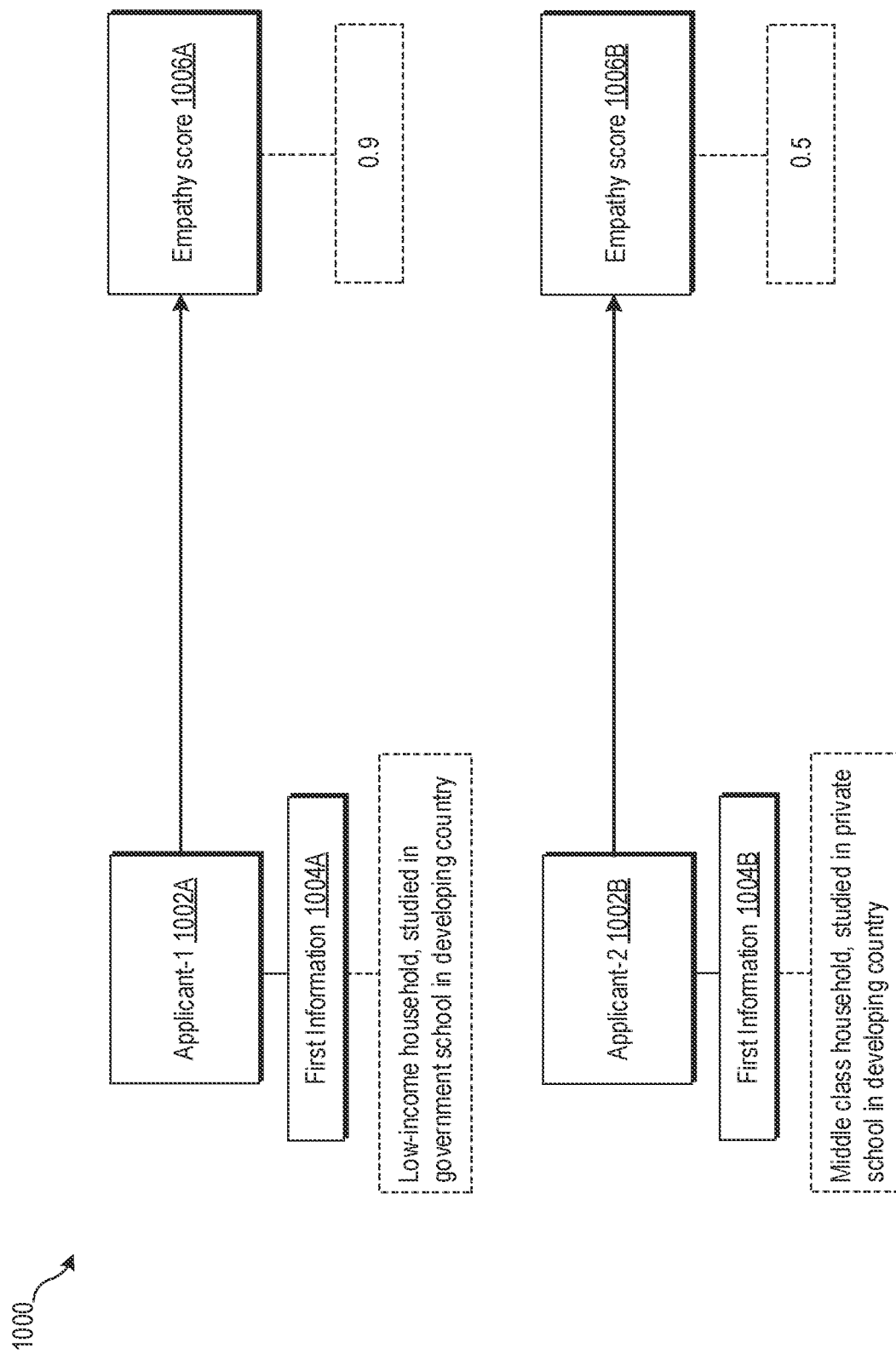
FIG. 10 is a diagram that illustrates an example scenario of empathy scores that may be determined for two candidates.

FIG. 10 is a diagram that illustrates an example scenario of empathy scores that may be determined for two candidates, arranged in accordance with at least one embodiment described in the present disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an example scenario 1000. The example scenario 1000 includes an Applicant-1 1002A, an Applicant-2 1002B, first information 1004A associated with the Applicant-1 1002A, first information 1004B associated with the Applicant-2 1002B, an empathy score 1006A associated with the Applicant-1 1002A, and an empathy score 1006B associated with the Applicant-2 1002B.

As shown in FIG. 10, the first information 1004A associated with the Applicant-1 1002A may include details such as, but not limited to, a family background (e.g., a low-income household), a type of education institution (e.g., a government school in a developing country), and a region/location (e.g., a developing country) associated with the Applicant-1 1002A. Similarly, as shown in FIG. 10, the first information 1004B associated with the Applicant-2 1002B may include details such as, but not limited to, a family background (e.g., a middle class household), a type of education institution (e.g., a private school in a developing country), and a region/location (e.g., a developing country) associated with the Applicant-2 1002B. The empathy score 1006A associated with the Applicant-1 1002A, which may be determined based on the first information 1004A, may have a higher value than the empathy score 1006B associated with the Applicant-2 1002B, which may be determined based on the first information 1004B. For example, the empathy score 1006A associated with the Applicant-1 1002A may have a value of "0.9", while the empathy score 1006B associated with the Applicant-2 1002B may have a value of "0.5". This may be because both the applicants may have same educational degree, however, the Applicant-1 1002A may be from a low-income family and may have completed his/her education from a government school, as compared to the Applicant-2 1002B who may be from a middle class family and may have completed his/her education from a private school. Thus, the Applicant-1 1002A may have a higher skill acquiring ability and hard working ability than the Applicant-2 1002B, and thereby, the empathy score 1006A associated with the Applicant-1 1002A may be higher than the empathy score 1006B associated with the Applicant-2 1002B.

It may be noted that the scenario 1000 shown in FIG. 10 is presented merely as example and should not be construed to limit the scope of the disclosure.

Figure 11:
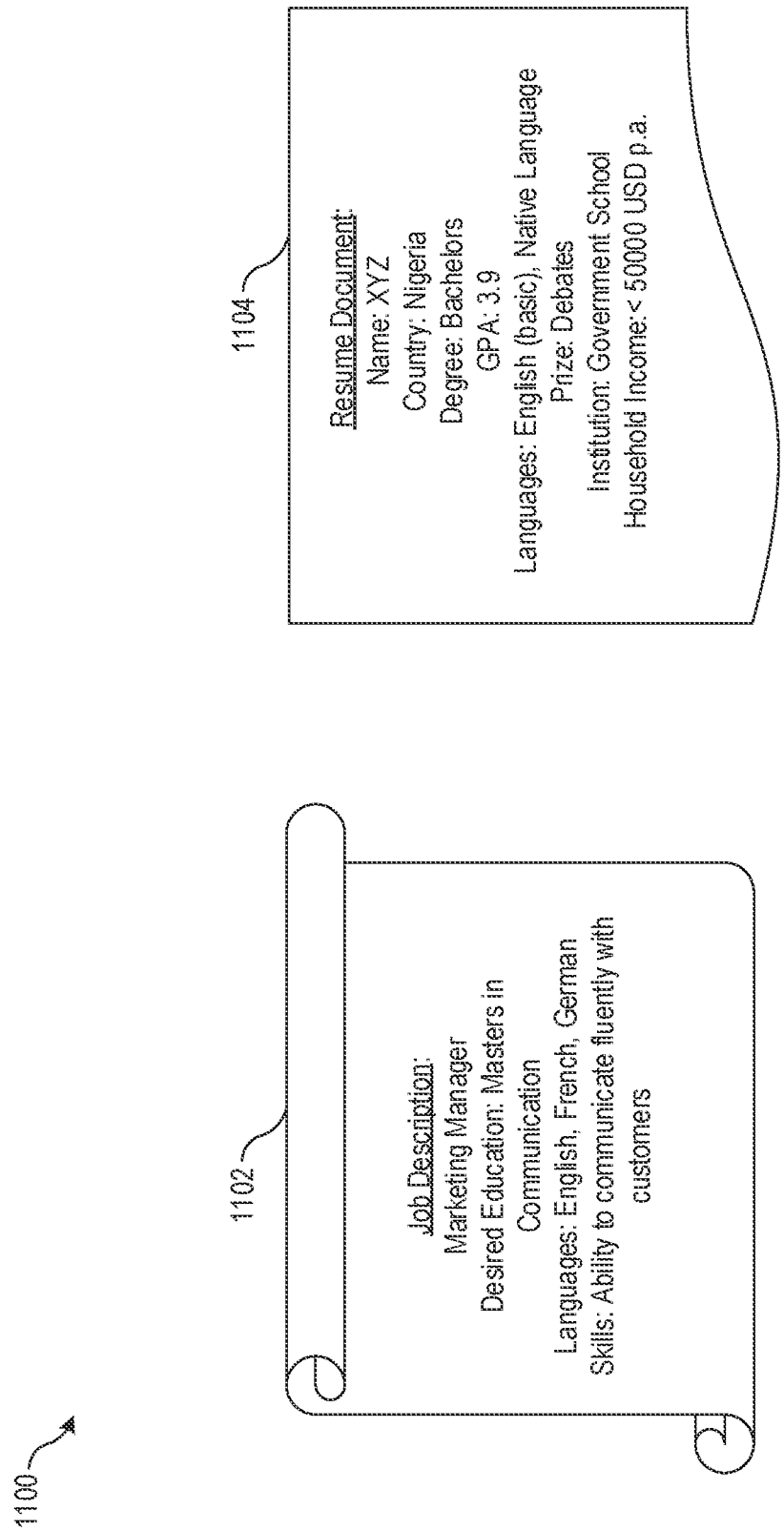
FIG. 11 is a diagram that illustrates an example scenario of a job description for a job and a resume document of a candidate for the job, all according to at least one embodiment described in the present disclosure.

FIG. 11 is a diagram that illustrates an example scenario of a job description for a job and a resume document of a candidate for the job, arranged in accordance with at least one embodiment described in the present disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown an example scenario 1100. The example scenario 1100 includes a job description 1102 associated with a job, and a resume document 1104 associated with a candidate for the job.

The job description 1102 may include details associated with requirements specific to the job. As shown in FIG. 11, such details in the job description 1102 may include, but are not limited to, a job role/designation (e.g., a Marketing Manager), a desired education (e.g., a Master's degree in communication), desired languages (e.g., English, French, and German), and desired skillset (e.g., an ability to communicate fluently with customers). Further, the resume document 1104 may include details associated with the candidate's educational qualifications, skillset, and personal information. FIG. 11 shows that details of the candidate in the resume document 1104 may include, but are not limited to, a name (e.g., "XYZ"), a country (e.g., Nigeria), a GPA score (e.g., 3.9), languages known (e.g., English (basic level) and a native language), a prize awarded (e.g., a prize in a debate), an educational institution (e.g., a government school), and a household income (e.g., less than 50,000 US Dollars per annum), associated with the candidate.

Typically, conventional solutions of candidate assessment may reject the candidate for the job based on the candidate not possessing the requisite educational qualifications (i.e., a Master's in communication) and language skills (i.e., French and German). However, the disclosed system for empathetic assessment of candidates may assign a high empathy score to the candidate, based on the details in the resume document 1104 and demographic parameters or similar details associated with a population of candidates in the same region as the candidate (e.g., Nigeria). The high empathy score may indicate that the candidate may have a high skill acquiring ability and hard working ability. For example, the high GPA score of the candidate may indicate that the candidate may be a quick learner who may have a good learning curve to grasp new skills on the job. Further, as the candidate has won prizes in debates, the candidate may be fluent in communication and may possess good negotiation skills. Thus, though the candidate may be capable, he/she may not be able to pursue a higher degree in communication (e.g., Master's in communication) due to lack of resources in his/her location (e.g., Nigeria) and/or low family income (e.g., less than 50,000 USD per annum). Similarly, the candidate may not be able to learn fluent English (or other desired language) due to his/her location (e.g., Nigeria). Thus, in such case, the disclosed system may assign a high empathy score to the candidate considering his/her high skill acquiring ability and hard working ability, in comparison to detail of the other candidates (i.e. population) in the same region acquired from the one or more knowledge DBs 106 (i.e. as described at block 404 in FIG. 4 and FIG. 6). The high empathy score assigned to the candidate (i.e. by the disclosed system) may lead to the selection of the candidate, who otherwise might be rejected for the job. Thus, the disclosed system may lead to an empathetic assessment of a candidate for a job.

It may be noted that the scenario 1100 shown in FIG. 11 is presented merely as example and should not be construed to limit the scope of the disclosure.

The disclosed electronic device 102 may determine a difference between the first set of features (for example, but is not limited to, educational qualification, certifications, languages known, and skill set) of a candidate and corresponding features in the second set of features of a population of candidates belonging to a similar demographic background as the candidate. An empathy score associated with the candidate may then be determined based on the difference between the first set of features associated with the candidate and the second set of features associated with the population of candidates. The difference (i.e. third set of features) may be indicative of a skill acquiring ability and also hard work on part of the candidate as compared to other candidates with a similar demographic background. A higher difference may entail a higher empathy score associated with the candidate and a likely selection of the candidate for a job. The disclosed electronic device 102 may thereby factor-in empathy for automated assessment of the candidate based on a difference of qualifications or skillsets of the candidate and that of the population of candidates of similar demographic background as the candidate, as compared to other conventional systems which may not consider such empathy in the assessment of the candidate. The disclosed electronic device 102 may be advantageous as the candidate's inherent skill acquiring ability and hard-working ability, which may be useful for most job positions, may be factored-in during the automated assessment of the candidate, based on the empathy score determined for the candidate. Thus, in the determination of the empathy score of the candidate and the evaluation of the resume of the candidate, individual constraints, needs, and differences of the various candidates may be considered. The disclosed empathy based candidate assessment technique may be applicable across various hiring scenarios, across different languages (i.e., resume documents of different languages), and may be combined with existing automated, semi-automated, or manual resume assessment techniques.

The disclosed electronic device 102 may determine the set of weights associated with the third set of features based on the application of the third set of features on the neural network model 216 (i.e. as described, for example, in FIG. 4 at block 408). Thus, the electronic device 102 may thereby provide a reasoning associated with a certain empathy score of a candidate, based on the set of weights associated with the third set of features on which the neural network model

216 may be trained. The reasoning may be indicative of a contribution of each feature associated with the candidate in the determination of a certain empathy score. The set of weights may be used as a decision-making factor in the selection of the candidate. Also, based on the empathy score of the candidate, the candidate may be provided an equal job opportunity with respect to other candidates with similar qualification/skillset but different demographic background. Thus, the disclosed empathetic assessment of candidates may also help in increasing diversity of the work-force in an organization. Further, by incorporating the counterfactual fairness criteria as the regularization constraint, the disclosed electronic device 102 may be less biased with respect to various protected or sensitive features (such as, age, physical disability, and gender), as compared to conventional systems.

Various embodiments of the disclosure may provide one or more non-transitory computer-readable storage media configured to store instructions that, in response to being executed, cause a system (such as, the example electronic device 102) to perform operations. The operations may include extracting first information about a first set of features, associated with a first candidate, from at least one of: a document or profile information associated with the first candidate. The operations may further include extracting second information about a second set of features, corresponding to the first set of features, from one or more databases. The second set of features may be associated with a population of candidates with at least one of a set of demographic parameters same as a demographic parameter of the first candidate. The operations may further include determining a third set of features based on a difference of corresponding features from the first set of features associated with the first candidate and the second set of features associated with the population of candidates. The operations may further include applying a pre-trained neural network model on the determined third set of features. The neural network model may be pre-trained to determine an empathy score for each of a set of candidates, based on the first set of features associated with the set of candidates. The operations may further include determining a set of weights associated with the third set of features, based on the application of the pre-trained neural network model. The operations may further include determining the empathy score associated with the first candidate based on the determined set of weights. The operations may further include rendering the determined empathy score associated with the first candidate.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   extracting first information about a first set of features, associated with a first candidate, from at least one of: a document or profile information associated with the first candidate;
   extracting second information about a second set of features, corresponding to the first set of features, from one or more databases,
      the second set of features are associated with a population of candidates with at least one of a set of demographic parameters same as a demographic parameter of the first candidate;
   determining a third set of features based on a difference of corresponding features from the first set of features associated with the first candidate and the second set of features associated with the population of candidates;
applying a pre-trained neural network model on the determined third set of features, the neural network model is pre-trained to determine an empathy score for each of a set of candidates, based on the first set of features associated with the set of candidates;
determining a set of weights associated with the third set of features, based on the application of the pre-trained neural network model;
determining the empathy score associated with the first candidate based on the determined set of weights; and
rendering the determined empathy score associated with the first candidate.

2. The method according to claim 1, further comprising applying a regularization constraint on the pre-trained neural network model based on a criteria associated with one or more protected features from the first set of features associated with the first candidate, wherein the determination of the empathy score associated with the first candidate is further based on the application of the regularization constraint on the pre-trained neural network model.

3. The method according to claim 2, wherein the criteria corresponds to a counterfactual criteria such that a first likelihood of acceptance of the first candidate with a first value of a first protected feature of the one or more protected features is same as a second likelihood of acceptance of a second candidate with a second value of the first protected feature, based on a determination that values of others of the first set of features are same.

4. The method according to claim 2, wherein the one or more protected features include at least one of: an age, a gender, or a physical disability, associated with the first candidate.

5. The method according to claim 1, wherein the profile information associated with the first candidate includes information associated with at least one of: a job coverletter, a set of recommendations, a source code repository, a project page, a professional networking webpage, or a social networking webpage associated with the first candidate.

6. The method according to claim 1, further comprising extracting a first set of named-entities from at least one of: the document or the profile information associated with the first candidate.

7. The method according to claim 6, further comprising:
filtering the extracted first set of named-entities to extract a second set of named-entities; and
extracting the first set of features associated with the first candidate based on removal of the extracted second set of named-entities from the extracted first set of named-entities.

8. The method according to claim 6, further comprising verifying an authenticity of the first information associated with at least one of: the document, the profile information, or the first set of named-entities associated with the first candidate, based on one or more public information databases, and wherein the determination of the empathy score associated with the first candidate is further based on the verification of the authenticity.

9. The method according to claim 1, wherein the first set of features includes at least one of: a set of education degrees, a set of certifications, a number of years of work experience, a location, a set of languages studied or known, a physical disability, a set of skills, an age, a gender, or a per capita income, associated with the first candidate.

10. The method according to claim 1, further comprising:
transmitting one or more queries to the one or more databases, wherein the one or more queries are formed based on one or more combinations of the first set of features associated with the first candidate; and
extracting the second information about the second set of features, corresponding to the first set of features, based on the transmitted one or more queries.

11. The method according to claim 1, wherein the second set of features includes at least one of: an average per capita income, a set of education degrees, a set of certifications, a number of job applicants, a number of institutions, a number of graduates, a number of jobs secured, or a set of languages studied or known, associated with the population of candidates.

12. The method according to claim 1, further comprising:
receiving a set of empathy scores for a set of documents in a training dataset of the neural network model, based on user input from one or more human evaluators;
computing a pair-wise ranking between the received set of empathy scores for each of the set of documents;
determining an optimum empathy score ranking for each of the set of documents based on a minimization of a Kendall Tau distance across the computed pair-wise rankings; and
training the neural network model based on the determined optimum empathy score ranking for each of the set of documents in the training dataset.

13. One or more non-transitory computer-readable storage media configured to store instructions that, in response to being executed, cause an electronic device to perform operations, the operations comprising:
extracting first information about a first set of features, associated with a first candidate, from at least one of: a document or profile information associated with the first candidate;
extracting second information about a second set of features, corresponding to the first set of features, from one or more databases,
the second set of features are associated with a population of candidates with at least one of a set of demographic parameters same as a demographic parameter of the first candidate;
determining a third set of features based on a difference of corresponding features from the first set of features associated with the first candidate and the second set of features associated with the population of candidates;
applying a pre-trained neural network model on the determined third set of features, the neural network model is pre-trained to determine an empathy score for each of a set of candidates based on the first set of features associated with the set of candidates;
determining a set of weights associated with the third set of features, based on the application of the pre-trained neural network model;
determining the empathy score associated with the first candidate based on the determined set of weights; and
rendering the determined empathy score associated with the first candidate.

14. The computer-readable storage media according to claim 13, wherein the operations further comprises applying a regularization constraint on the pre-trained neural network model based on a criteria associated with one or more protected features from the first set of features associated with the first candidate, and wherein the determination of the empathy score associated with the first candidate is further based on the application of the regularization constraint on the pre-trained neural network model.

15. The computer-readable storage media according to claim 13, wherein the operations further comprises:
   transmitting one or more queries to the one or more databases, wherein the one or more queries are formed based on one or more combinations of the first set of features associated with the first candidate; and
   extracting the second information about the second set of features, corresponding to the first set of features, based on the transmitted one or more queries.

16. The computer-readable storage media according to claim 13, wherein the operations further comprises verifying an authenticity of the first information associated with at least one of: the document, the profile information, or a first set of named-entities associated with the first candidate, based on one or more public information databases, and wherein the determination of the empathy score associated with the first candidate is further based on the verification of the authenticity.

17. An electronic device, comprising:
   a memory storing instructions; and
   a processor, coupled to the memory, that executes the instructions to perform a process comprising:
   extracting first information about a first set of features, associated with a first candidate, from at least one of:
   a document or profile information associated with the first candidate;
   extracting second information about a second set of features, corresponding to the first set of features, from one or more databases,
      the second set of features are associated with a population of candidates with at least one of a set of demographic parameters same as a demographic parameter of the first candidate;
   determining a third set of features based on a difference of corresponding features from the first set of features associated with the first candidate and the second set of features associated with the population of candidates;
   applying a pre-trained neural network model on the determined third set of features, the neural network model is pre-trained to determine an empathy score for each of a set of candidates based on the first set of features associated with the set of candidates;
   determining a set of weights associated with the third set of features, based on the application of the pre-trained neural network model;
   determining the empathy score associated with the first candidate based on the determined set of weights; and
   rendering the determined empathy score associated with the first candidate.

18. The electronic device according to claim 17, wherein the process further comprises applying a regularization constraint on the pre-trained neural network model based on a criteria associated with one or more protected features from the first set of features associated with the first candidate, wherein the determination of the empathy score associated with the first candidate is further based on the application of the regularization constraint on the pre-trained neural network model.

19. The electronic device according to claim 17, wherein the process further comprises:
   transmitting one or more queries to the one or more databases, wherein the one or more queries are formed based on one or more combinations of the first set of features associated with the first candidate; and
   extracting the second information about the second set of features, corresponding to the first set of features, based on the transmitted one or more queries.

20. The electronic device according to claim 17, wherein the process further comprises verifying an authenticity of the first information associated with at least one of: the document, the profile information, or a first set of named-entities associated with the first candidate, based on one or more public information databases, and wherein the determination of the empathy score associated with the first candidate is further based on the verification of the authenticity.

* * * * *